United States Patent

Fujimoto

[11] Patent Number: 5,987,082
[45] Date of Patent: *Nov. 16, 1999

[54] PLAYBACK APPARATUS AND PLAYBACK METHOD

[75] Inventor: Kensuke Fujimoto, Kanagawa, Japan

[73] Assignee: Sony Corporation, Tokyo, Japan

[*] Notice: This patent is subject to a terminal disclaimer.

[21] Appl. No.: 08/889,743

[22] Filed: Jul. 10, 1997

[30] Foreign Application Priority Data

Jul. 30, 1996 [JP] Japan ................................ 8-200055

[51] Int. Cl.$^6$ ........................................ H04L 7/00
[52] U.S. Cl. ............................................. 375/355
[58] Field of Search ........................... 375/355; 369/124, 369/32, 54, 59

[56] References Cited

U.S. PATENT DOCUMENTS

| | | | |
|---|---|---|---|
| 4,672,597 | 6/1987 | Yamazaki | 369/59 |
| 4,704,711 | 11/1987 | Gerard et al. | 369/59 |
| 5,440,532 | 8/1995 | Yokogawa et al. | 369/32 |
| 5,553,055 | 9/1996 | Yokota et al. | 369/124 |
| 5,559,513 | 9/1996 | Rothermel et al. | 341/61 |
| 5,579,004 | 11/1996 | Linz | 341/144 |
| 5,589,830 | 12/1996 | Linz et al. | 341/110 |
| 5,590,100 | 12/1996 | Ogusu et al. | 369/32 |
| 5,848,047 | 12/1998 | Fujimoto | 369/124 |

OTHER PUBLICATIONS

U.S. application No. 08/887,519, filed Jul. 3, 1997.

*Primary Examiner*—Stephen Chin
*Assistant Examiner*—Mohammad Ghayour
*Attorney, Agent, or Firm*—Limbach & Limbach, L.L.P.

[57] ABSTRACT

To reduce a data-error rate caused by interpolation errors. An adder computes the sum of a sampled value Si+1 of a playback signal and a value 8×Si+1 produced by a bit shifter to output the sum 9×Si+1 to an adder. The adder adds the sum (9×Si+1) supplied thereto by the adder to a sum (9×Si) supplied thereto after being delayed by a delay element and outputs the result of the addition (9×Si+9×Si+1) to an adder. An adder computes the sum of a sampled value Si-1 supplied thereto after being delayed by delay elements and a sampled value Si+2 supplied thereto by an A/D converter and outputs sum (Si-1+Si+2) to the adder. The adder which is used as a subtractor computes the difference between the sum (9×Si+9×Si+1) supplied thereto by the adder and the sum (Si-1+Si+2) supplied thereto by the adder and outputs the difference (Si-1-9×Si-9×Si+1+Si+2) to a bit shifter. The bit shifter shifts the difference (Si-1-9×Si-9×Si+1+Si+2) supplied thereto by the adder by four bits toward the LSB and outputs the right-shifted value (Si-1-9×Si-9×Si+1+Si+2)/16 to a second interpolation circuit as a first interpolation value Si' along with the sampled values Si and Si+1. As a result, the number of sampled values seemingly appears increased.

4 Claims, 19 Drawing Sheets

FIG. I
(PRIOR ART)

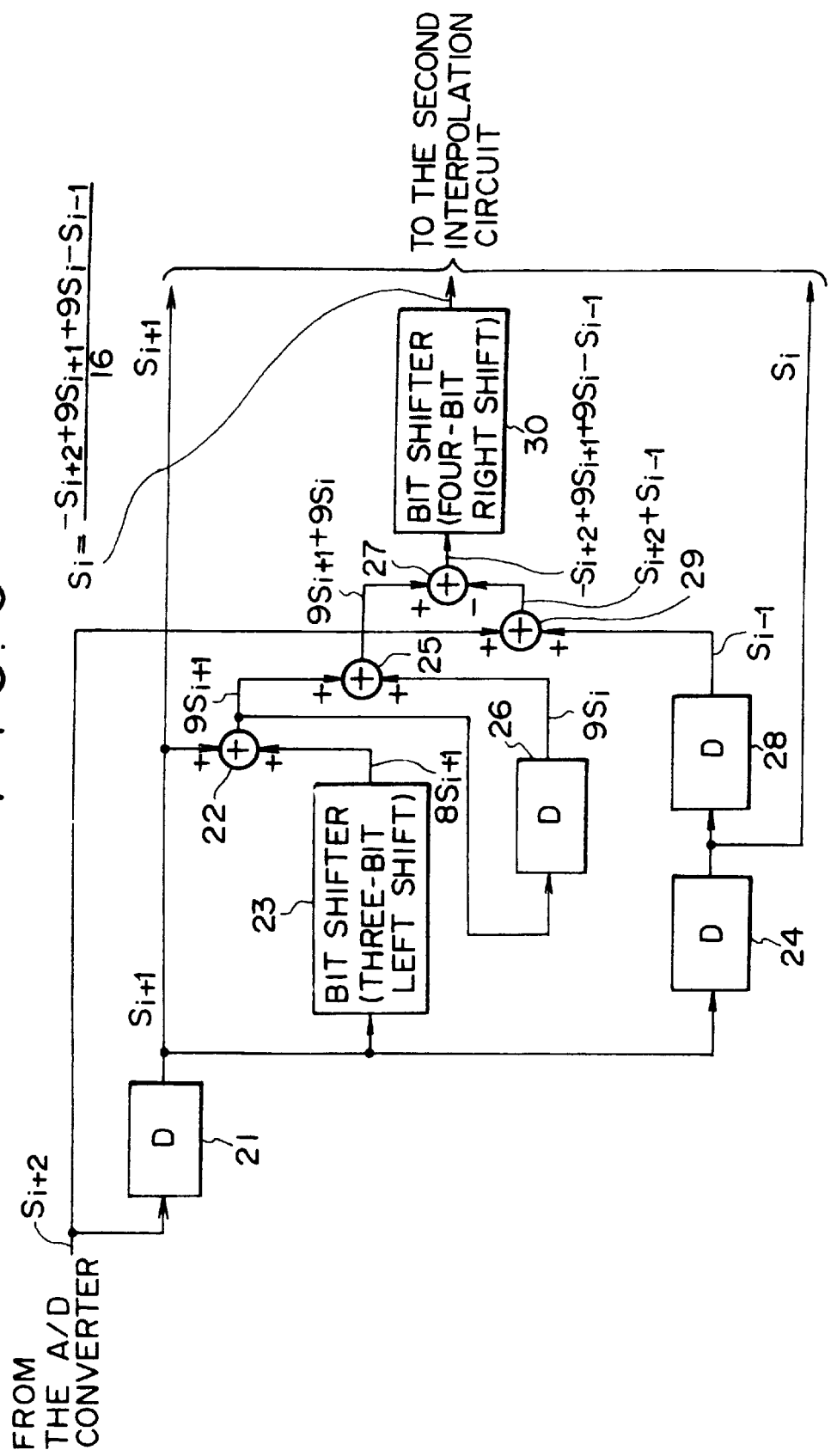
F I G. 5

ZERO-CROSS ON A RISING EDGE

ZERO-CROSS ON A FALLING EDGE

PLAYBACK APPARATUS AND PLAYBACK METHOD

BACKGROUND OF THE INVENTION

In general, the present invention relates to a playback apparatus and a playback method. In particular, the present invention relates to a playback apparatus and a playback method for computing interpolation values of a given signal at a predetermined phase of a second clock signal as an ultimate playback signal by typically linear interpolation using first and second digital values as base points. The second digital values are found from the first digital values which are obtained by sampling the given signal at sampling times synchronized with a first clock signal. To put it in detail, the second digital values are each found by interpolation using the first digital values as base points at a time different from the sampling times at which the first digital values are found from the given signal in synchronization with the first clock signal. The interpolation is based on a function of at least a second order.

A compact disk, a representative recording medium for storing digital data, is becoming more and more popular in a wide range of applications.

When digital data is reproduced from such a recording medium like, for example, an optical disk or an opto-magnetic disk, in most cases, a clock signal is extracted from a signal detected from the disk and digital data is then reproduced from the detected signal in synchronization with the extracted clock signal. Synchronization of extracting data from a signal with a clock signal extracted from the same signal is referred to as the so-called self synchronization.

In such self synchronization, the clock signal is extracted from the detected signal by using a PLL (Phase Locked Loop) circuit.

FIG. 1 is a diagram showing a typical configuration of the conventional playback apparatus having an analog PLL circuit.

As shown in the figure, a read-out device 121 radiates a laser beam to an optical disk 201 such as a compact disk and receives a laser beam reflected by the optical disk 201, that is, a return light coming from the optical disk 201. An electrical signal representing the quantity of the incoming return light is then supplied by the read-out device 121 to a waveform shaping unit 122. The electrical signal is the so-called playback signal.

The waveform shaping unit 122 converts the playback signal supplied by the read-out device 121 into a binary signal and outputs the binary signal to a latch circuit 123 and an analog PLL circuit 124 as a playback signal.

The analog PLL circuit 124 extracts a clock signal from the playback signal supplied by the waveform shaping unit 122 and supplies the clock signal to the latch circuit 123. Values of the binary playback signal which are either 0 or 1 change at intervals each equal to a multiple of a predetermined bit period T. It should be noted that the intervals each correspond to a piece of data recorded on the optical disk 201. The analog PLL circuit 124 extracts the bit period T from the interval, generating a clock signal having a period corresponding to the bit period T.

In the analog PLL circuit 124, a phase comparator 141 computes a phase error between the playback signal supplied by the waveform shaping unit 122 and a clock signal (a PLL clock signal) oscillated by a voltage controlled oscillator (VCO) 143. The phase error is output by the phase comparator 141 to a loop filter 142 for eliminating high-frequency components, that is, components in an unnecessary frequency band, from the phase error. The loop filter 142 then outputs the processed phase error to the VCO 143.

In accordance with the voltage of a signal supplied from the loop filter 142, the VCO 143 oscillates the PLL clock signal while adjusting the frequency thereof so that the phase error with respect to the playback signal supplied by the waveform shaping unit 122 is eliminated. The PLL clock signal is fed back to the phase comparator 141 and, at the same time, supplied to the latch circuit 123.

In this way, the analog PLL circuit 124 generates the PLL clock signal synchronized with the playback signal.

The latch circuit 123 outputs the playback signal supplied by the waveform shaping circuit 122 in synchronization with the PLL clock signal oscillated by the analog PLL circuit 124 to a playback circuit at the following stage which is not shown in the figure.

However, the analog PLL circuit 124 has a problem that it is easily affected by changes in environment, changes with the lapse of time and component variations. There is also raised a problem that it is difficult to put the analog PLL circuit in a highly integrated circuit chip due to the fact that the PLL circuit is an analog circuit.

In order to solve the problem, a digital PLL circuit has been developed.

FIG. 2 is a diagram showing a typical configuration of a digital PLL circuit.

As shown in the figure, the digital PLL circuit comprises a digital phase comparator 161, a digital loop filter 162 and a variable-frequency oscillator (VFO) 163 as a substitute for the VCO. The VFO 163 adjusts the frequency of an output signal thereof by adding or eliminating pulses to and from the output signal in accordance with the digital value of a phase error supplied by the digital phase comparator 161 to the VFO 163 by way of the digital loop filter 162. As an alternative, including two embedded oscillators with frequencies different from each other, the VFO 163 adjusts the frequency of an output signal thereof by switching the generation of the output signal from on e embedded oscillator to the other embedded one in accordance with the digital value of a phase error supplied by the digital phase comparator 161 to the VFO 163 by way of the digital loop filter 162.

In order to adjust the oscillation frequency smoothly in accordance with phase error, the VFO 163 generates an interim output signal with a frequency equal to a multiple of the frequency of a finally desired clock signal by adjusting the frequency of the interim output signal. The VFO 163 supplies the interim output signal to a frequency divider 164 for dividing the frequency thereof. The output of the frequency divider 164 is the finally desired clock signal which is fed back to the digital phase comparator 161 and, at the same time, supplied to a circuit at the following stage which is not shown in the figure.

In an apparatus for processing data at a high speed or in an apparatus having a high transfer speed, by the way, the frequency of the clock signal used in the apparatus is high. There is thus raised a problem that it is difficult to implement a VFO which is capable of oscillating an interim output signal with a frequency equal to a multiple of the high frequency of the clock signal and that, even if such a VFO can be implemented, the cost thereof will be high.

In order to solve the problem described above, the applicant of the application of the present invention for a patent disclosed an apparatus capable of operating at a relatively low frequency in documents such as Japanese Patent Laid-open No. Hei8-184428 wherein a second clock signal is generated in synchronization with a first clock signal while adjusting the clock frequency of the second clock signal in accordance with a phase error of a playback signal and an interpolation value at a predetermined phase of the second clock signal is computed from sampled values (referred to as first digital values) obtained by sampling the playback signal in synchronization with a first clock signal while adjusting the clock frequency of the second clock signal as shown in FIG. 3.

This apparatus includes an interpolation circuit, a circuit for computing an interpolation value at a predetermined phase of the second clock signal, as a configuration element of the PLL. Thus, in order to carry out PLL processing at a high speed, that is, in order to guarantee a good loop characteristic over a wide of range, a simple computing technique such as linear interpolation is adopted to compute interpolation values of the playback signal.

With a simple computing technique such as linear interpolation, however, errors are generated in the resulting data due to interpolation errors, giving rise to a problem that it is difficult to reduce the data-error rate.

OBJECT AND SUMMARY OF THE INVENTION

The present invention addresses the problems described above. It is thus an object of the present invention to provide a playback apparatus and a playback method wherein:

sampled values of a playback signal are obtained by sampling the playback signal at sampling times synchronized with a first clock signal;

first interpolation values of the playback signal are each found by interpolation of the playback signal based on a function of at least a second order by using the sampled values as base points, with the interpolation carried out at a point of time different from the sampling times at which the sampled values are found from the playback signal; and second interpolation values are computed at a predetermined phase of a second clock signal by linear interpolation using the sampled values and the first interpolation values as base points, whereby the number of errors in the final interpolation values computed at the predetermined phase of the second clock signal is reduced, resulting in a decreased data-error rate.

According to a first aspect of the present invention, there is provided a playback apparatus characterized in that said apparatus comprises:

a first interpolation means for computing a second digital value from first digital values obtained by sampling a predetermined signal in synchronization with a first clock signal wherein said second digital value is computed at a predetermined point of time different from a sampling time synchronized with said first clock signal by interpolation based on a function of at least a second order;

a second interpolation means for computing an interpolation value of said predetermined signal at a predetermined phase of a second clock signal from said first and second digital values;

a phase-error computing means for computing a phase error of said interpolation value; and a clock-signal generating means for generating said second clock signal by adjusting the clock frequency thereof in accordance with said phase error.

According to a second aspect of the present invention, there is provided a playback method characterized in that said method comprises the steps of:

computing a second digital value from first digital values obtained by sampling a predetermined signal in synchronization with a first clock signal at a predetermined point of time different from a sampling time synchronized with said first clock signal by interpolation based on a function of at least a second order;

computing an interpolation value of said predetermined signal at a predetermined phase of a second clock signal from said first and second digital values;

computing a phase error of said interpolation value; and generating said second clock signal by adjusting the clock frequency thereof in accordance with said phase error.

In the playback apparatus according to the first aspect of the present invention, a first interpolation means is used for computing a second digital value from first digital values obtained by sampling a predetermined signal in synchronization with a first clock signal wherein the second digital value is computed at a predetermined point of time different from a sampling time synchronized with the first clock signal by interpolation based on a function of at least a second order;

a second interpolation means is used for computing an interpolation value of the predetermined signal at a predetermined phase of a second clock signal from the first and second digital values;

a phase-error computing means is used for computing a phase error of the interpolation value; and a clock-signal generating means is used for generating the second clock signal by adjusting the clock frequency thereof in accordance with the phase error.

With a playback method according to the second aspect of the present invention, a second digital value is computed from first digital values obtained by sampling a predetermined signal in synchronization with a first clock signal at a predetermined point of time different from a sampling time synchronized with the first clock signal by interpolation based on a function of at least a second order;

an interpolation value of the predetermined signal is computed at a predetermined phase of a second clock signal from the first and second digital values;

a phase error of the interpolation value is computed; and the second clock signal is generated by adjusting the clock frequency thereof in accordance with the phase error.

BRIEF DESCRIPTION OF THE DIAGRAMS

The embodiment of the present invention has been explained with reference to the following figures wherein:

FIG. 5 is a block diagram showing a typical configuration of a first interpolation circuit 3 employed in the playback apparatus shown in FIG. 4;

DETAILED DESCRIPTION OF THE PREFERRED EMBODIMENT

Figure 1:
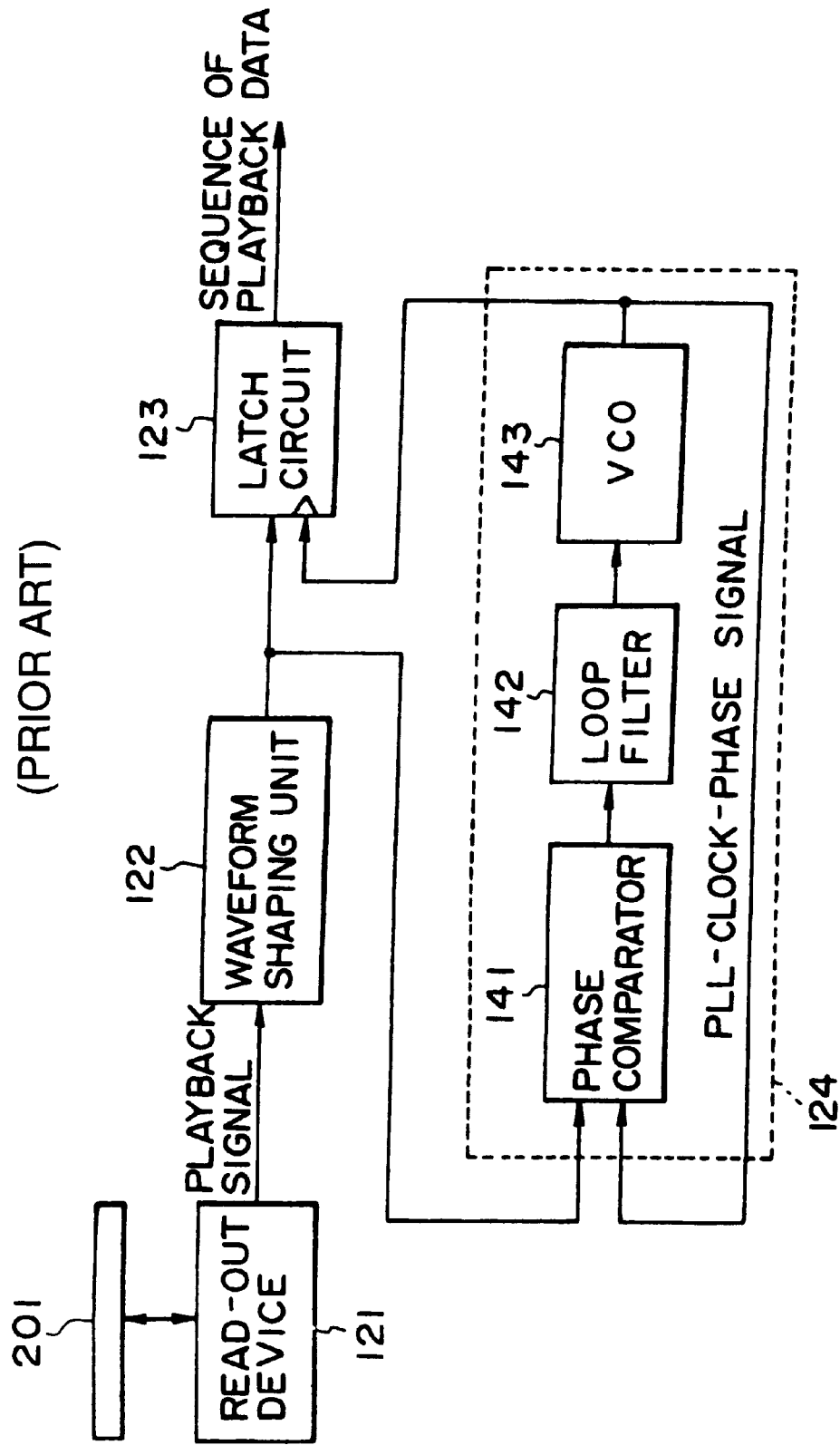
FIG. 1 is a block diagram showing a typical configuration of the conventional playback apparatus.
Figure 2:
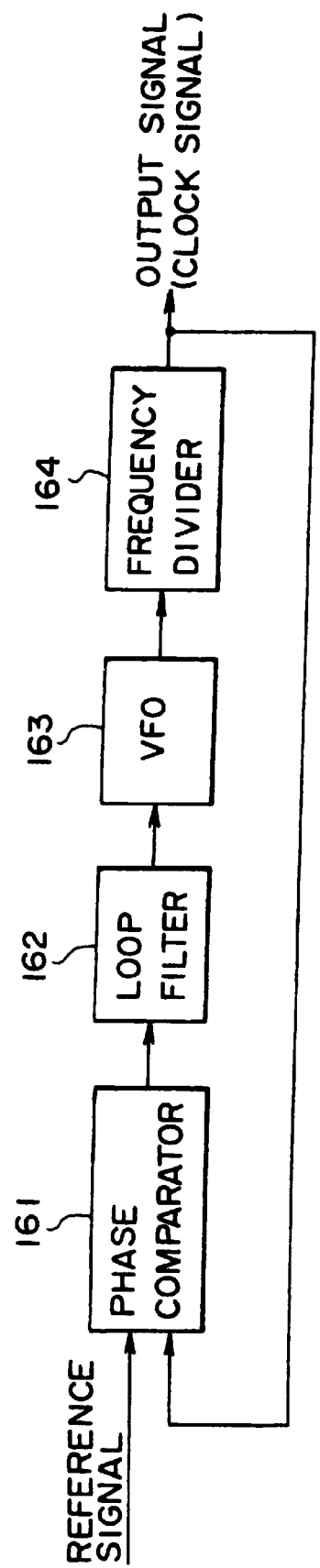
FIG. 2 is a block diagram showing a typical configuration of a digital PLL circuit.
Figure 3:
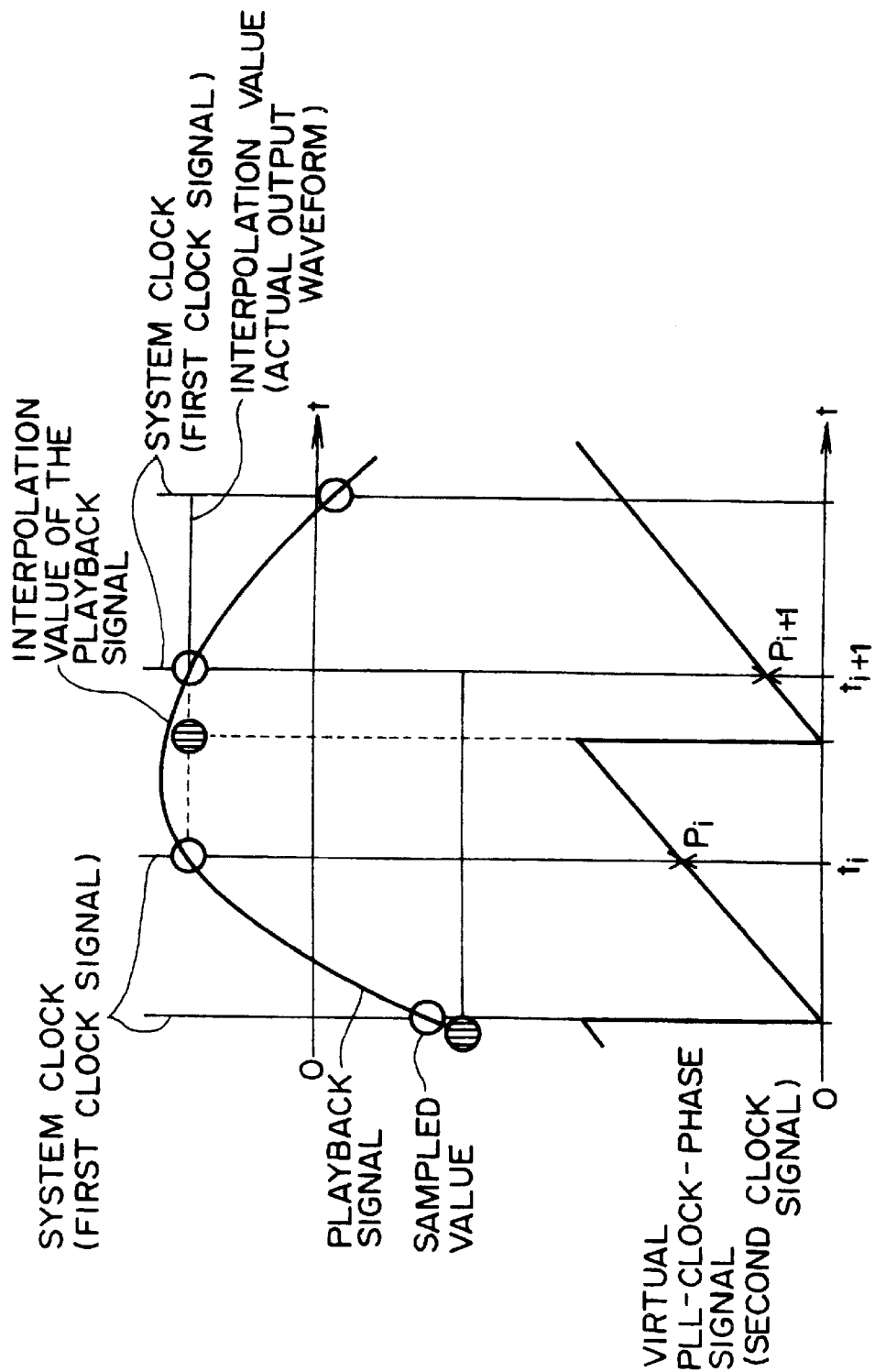
FIG. 3 is a diagram showing an example of an interpolation value found by using the conventional method.
Figure 4:
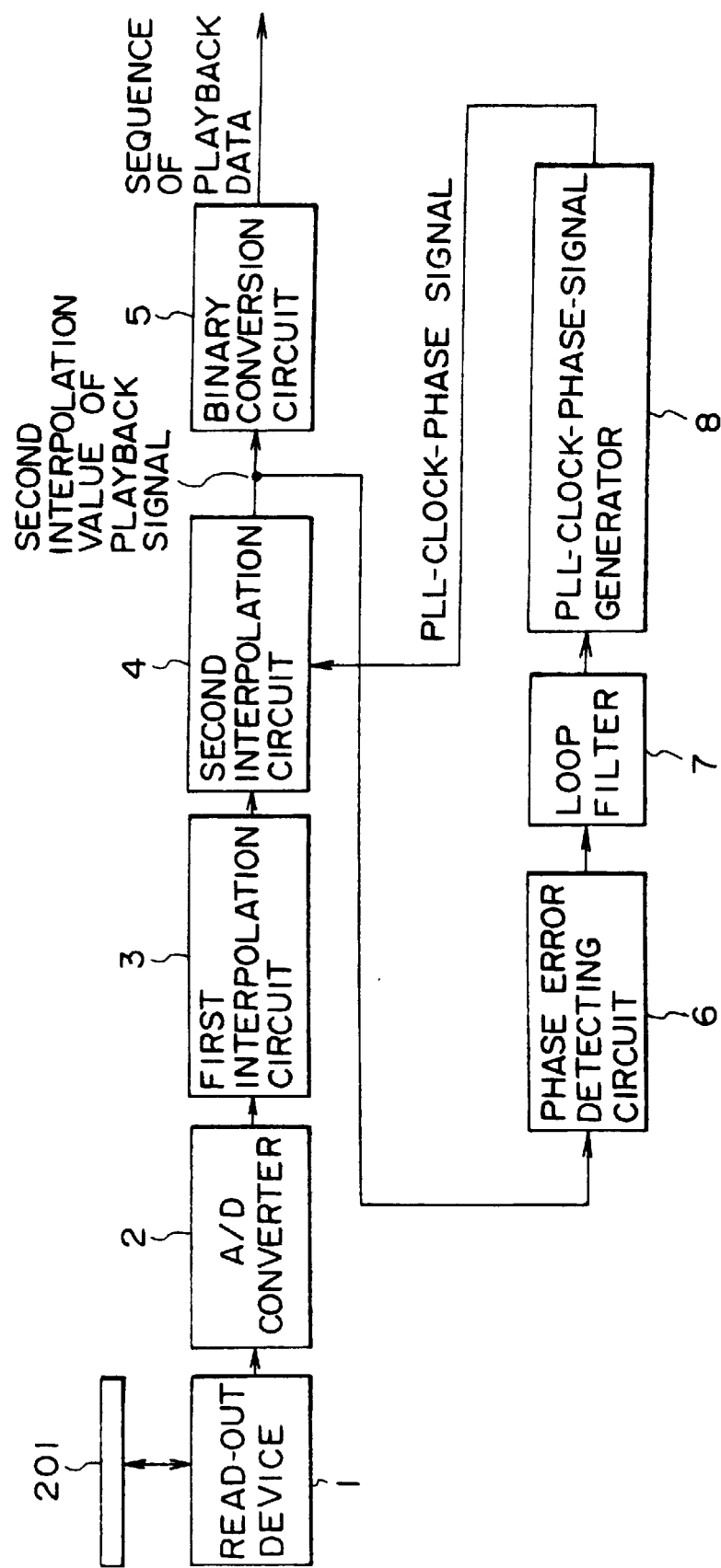
FIG. 4 is a block diagram showing the configuration of an embodiment implementing a playback apparatus provided by the present invention.

The present invention will become more apparent from a study of the following detailed description of some preferred embodiments with reference to accompanying diagrams some of which show the embodiment. FIG. 4 is a diagram showing a typical configuration of an embodiment implementing a playback apparatus provided by the present invention.

As shown in the figure, a read-out device 1 radiates a laser beam to an optical disk 201 such as a compact disk and receives a laser beam reflected by the optical disk 201, that is, a return light coming from the optical disk 201. An electrical signal representing the quantity of the incoming return light, that is, a playback signal, is then supplied by the read-out device 1 to an A/D converter 2.

The A/D converter 2 supplies a first interpolation circuit (or a first interpolation means) 3 with sampled values, digital values each having a predetermined number of bits. The sampled values are obtained by sampling the playback signal coming from the read-out device 1 in synchronization with a system clock signal (or a first clock signal).

The first interpolation circuit 3 carries out interpolation based on a function of at least a second order, typically a third-order function, by using a plurality of sampled values (or first digital values) supplied thereto by the A/D converter 2 as base data in synchronization with the system clock to produce first interpolation values. The first interpolation values are each a value of the playback signal at an intermediate point of time between two consecutive sampling times at which the sampled values are produced in synchronization with the system clock signal.

In synchronization with the system clock signal, the first interpolation circuit 3 provides the second interpolation circuit (or the second interpolation means) 4 with two consecutive sampled values and a first interpolation value (or a second digital value). As described above, the first interpolation values are each a value of the playback computed at an intermediate time between two consecutive sampling times at which two sampled values are generated.

Operating in synchronization with the system clock signal, the second interpolation circuit 4 computes a value of the playback signal (or a second interpolation value) at a zero phase of a PLL-clock-phase signal P (or a second clock signal) supplied thereto by a PLL-clock-phase-signal generator (or a clock-signal generating means) 8 in synchronization with the system clock signal by linear interpolation using one of the two consecutive sampled values and the first interpolation value supplied thereto by the first interpolation circuit 3 as base points. It should be noted that one of the two consecutive sampled values is selected as a base point in accordance with the timing of the occurrence of the zero phase of the PLL-clock-phase signal P. The second interpolation circuit 4 then supplies the second interpolation value, a digital value having a predetermined number of bits, to a binary conversion circuit 5 and, at the same time, feeds the second interpolation value back to a phase-error detecting circuit (or a phase-error computing means) 6.

Also operating in accordance with the system clock signal, the binary conversion circuit 5 converts the second interpolation value of the playback signal supplied thereto by the interpolation circuit 4 into a binary value, that is, into 0 or 1 when an enable is supplied thereto by the PLL-clock-phase signal generator 8 by way of the second interpolation circuit 4. The binary value is then supplied to a circuit at the following stage which is not shown in the figure.

Also operating in accordance with the system clock signal, the phase-error detecting circuit 6 detects a transition of the second interpolation value of the playback signal fed back thereto by the second interpolation circuit 4 from positive to negative or vice versa which is known as an interpolation-value zero cross. The zero-cross timing is then used for generating a phase-error signal which is then output to a loop filter 7.

Also operating in accordance with the system clock signal, the loop filter 7 passes on the phase-error signal supplied by the phase-error detecting circuit 6 to the PLL-clock-phase-signal generator 8 after removing high-frequency components from the phase-error signal.

Also operating in accordance with the system clock signal, the PLL-clock-phase-signal generator 8 generates the PLL-clock-phase signal P having a saw-tooth waveform (with the frequency thereof) determined by the phase-error signal which is supplied thereto by the loop filter 7 with the high-frequency components thereof removed. The PLL-clock-phase signal P is supplied to the second interpolation circuit 4 as described above.

FIG. 5 is a diagram showing a typical configuration of the first interpolation circuit 3. The first interpolation circuit 3 carries out interpolation based on a third-order function using sampled values $S_{i-1}$, $S_i$, $S_{i+1}$ and $S_{i+2}$ of a playback signal sampled at points of time ti−1, ti, ti+1 and ti+2 as base points in order to find a value of the playback signal (or a first interpolation value) Si' at a point of time ((ti+ti+1)/2) between the points of time ti and ti+1.

It should be noted that the first interpolation value Si' is a value at a point of time ((ti+ti+1)/2) of the following third-order fitting function:

$$y = a \times t^3 + b \times t^2 + c \times t + d$$

where coefficients a, b, c and d are found from the following four third-order functions of the sampled values:

$$Si+2 = a \times (ti+2)^3 + b \times (ti+2)^2 + c \times (ti+2) + d$$

$$Si+1 = a \times (ti+1)^3 + b \times (ti+1)^2 + c \times (ti+1) + d$$

$$Si = a \times (ti)^3 + b \times (ti)^2 + c \times (ti) + d$$

$$Si-1 = a \times (ti-1)^3 + b \times (ti-1)^2 + c \times (ti-1) + d$$

That is to say, the first interpolation value Si' is computed as a value of the expression (Si−1−9×Si+1−9×Si+Si+2)/16.

As shown in the figure, the first interpolation circuit 3 includes a delay element 21 for holding the sampled value Si+2 resulting from sampling of the playback signal by the A/D converter 2 for one system-clock period and outputting the sampled value Si+2 at the next system clock to the second interpolation circuit 4, an adder 22, a bit shifter 23 and a delay element 24. That is to say, at a system clock the sampled value Si+2 is supplied to the first interpolation circuit 3 by the A/D converter 2, the delay element 21 supplies the sampled value Si+1 held therein so far for one system-clock period to the second interpolation circuit 4, the adder 22, the bit shifter 23 and the delay element 24.

The bit shifter 23 shifts the sampled value Si+1 supplied thereto by the delay element 21 by three bits toward the MSB (most significant bit) and outputs the left-shifted value (8×Si+1) to the adder 22.

The adder 22 computes the sum of the sampled value Si+1 supplied thereto by the delay element 21 and the left-shifted (8×Si+1) supplied thereto by the bit shifter 23 and outputs the sum (9×Si+1) to an adder 25 and a delay element 26.

The delay element 26 holds the sum (9×Si+1) supplied thereto by the adder 22 for one system-clock period and outputs the sum (9×Si+1) at the next system clock to the adder 25. That is to say, at a system clock the sum (9×Si+1) is supplied by the adder 22 to the delay element 26, the delay element 26 supplies a sum (9×Si) held therein so far for one system-clock period to the adder 25.

The adder 25 computes the sum of the sum (9×Si) supplied thereto by the delay element 26 and the sum (9×Si+1) supplied thereto by the adder 22 and outputs the result of the addition (9×Si+9×Si+1) to an adder 27.

The delay element 24 holds the sampled value Si+1 supplied thereto by the delay element 21 for one system-clock period and outputs the sampled value Si+1 at the next system clock to a delay element 28 and the second interpolation circuit 4. That is to say, at a system clock the sampled value Si+1 is supplied to the delay element 24 by the delay element 21, the delay element 24 outputs the sampled value Si held therein so far for one system clock to the delay element 28 and the second interpolation circuit 4.

The delay element 28 holds the sampled value Si supplied thereto by the delay element 24 for one system-clock period and outputs the sampled value Si at the next system clock to an adder 29. That is to say, at a system clock the sampled value Si is supplied to the delay element 28 by the delay element 24, the delay element 28 outputs the sampled value Si−1 held therein so far for one system clock to the adder 29.

The adder 29 computes the sum of the sampled value Si−1 supplied thereto by the delay element 28 and the sampled value Si+2 supplied thereto by the A/D converter 2 and outputs sum (Si−1+Si+2) to the adder 27.

The adder 27 which is used as a subtractor computes the difference between the sum (9×Si+9×Si+1) supplied thereto by the adder 25 and the sum (Si−1+Si+2) supplied thereto by the adder 29 and outputs the difference (Si−1−9×Si−9×Si+1+Si+2) to a bit shifter 30.

The bit shifter 30 shifts the difference (Si−1−9×Si−9×Si+1+Si+2) supplied thereto by the adder 27 by four bits toward the LSB (least significant bit) and outputs the right-shifted value (Si−1−9×Si−9×Si+1+Si+2)/16 to the second interpolation circuit 4 as the first interpolation value Si'.

Figure 6:
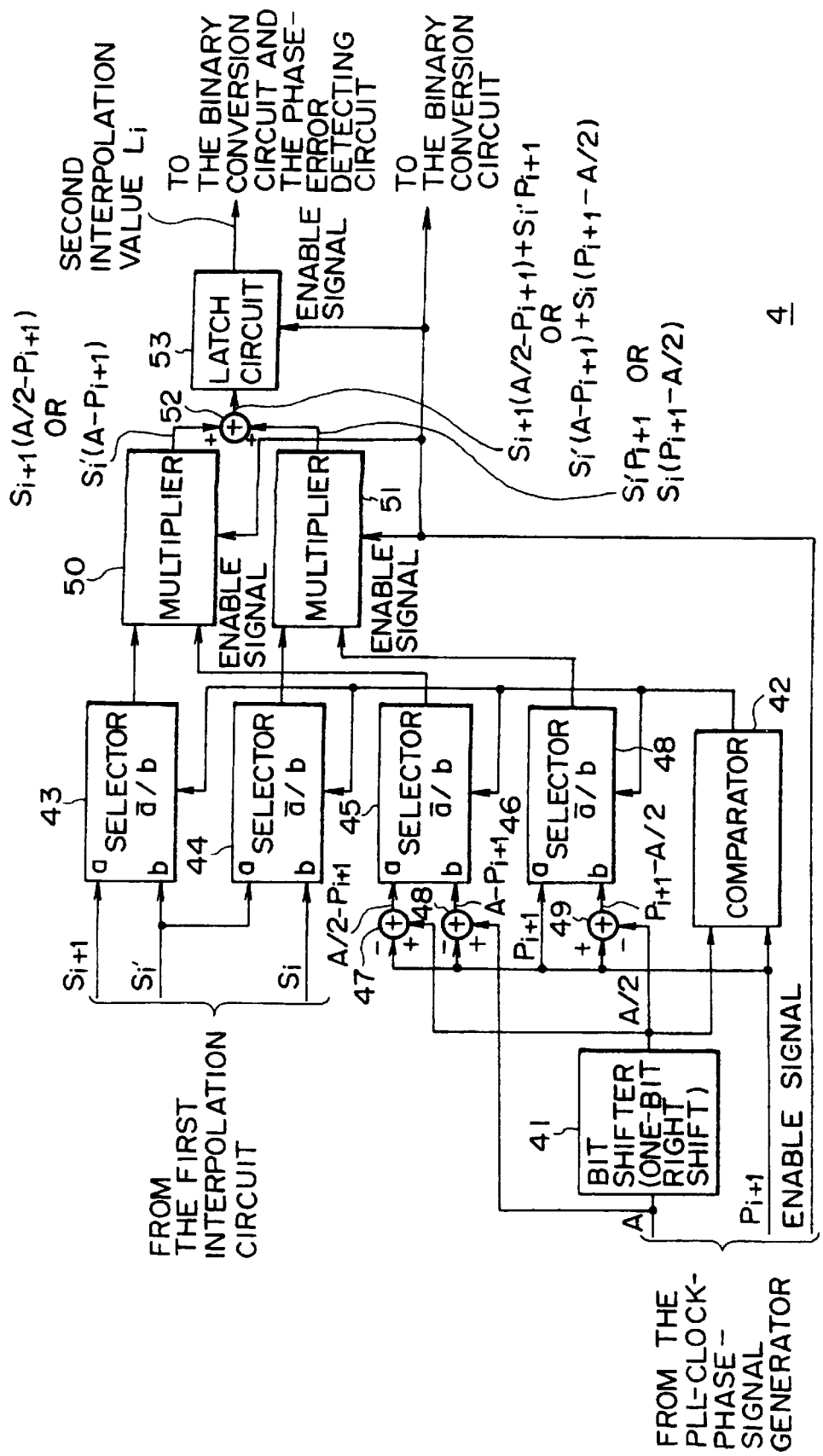
FIG. 6 is a block diagram showing a typical configuration of a second interpolation circuit 4 employed in the playback apparatus shown in FIG. 4.

FIG. 6 is a diagram showing a typical configuration of the second interpolation circuit 4.

As shown in the figure, the second interpolation circuit 4 includes a bit shifter 41 for shifting a digital constant value A (or a first constant) supplied thereto by the PLL-clock-phase-signal generator 8 by one bit toward the LSB (least significant bit) and outputting the right-shifted value A/2 to a comparator 42, an adder 47 and another adder 49.

The comparator 42 compares the right-shifted value A/2 supplied thereto by the bit shifter 41 with a value Pi+1 of the PLL-clock-phase signal P supplied thereto by the PLL-clock-phase-signal generator 8 by computing the difference (Pi+1−A/2) between them. The comparator 42 also finds out whether the computed difference (Pi+1−A/2) is positive or negative. If the computed difference (Pi+1−A/2) is found positive, that is, if Pi+1>A/2, a predetermined positive control signal is supplied to selectors 43 to 46. If the computed difference (Pi+1−A/2) is found negative or equal to zero, that is, if Pi+1≦A/2, on the other hand, a predetermined negative control signal is supplied to the selectors 43 to 46.

The selector 43 receives the sampled value Si+1 and the first interpolation value Si' supplied by the first interpolation circuit 3 by way of terminals a and b respectively of the selector 43. When a positive control signal is supplied to the selector 43 by the comparator 42, the selector 43 passes on the first interpolation value Si' supplied thereto by way of the terminal b to a multiplier 50. When a negative control signal is supplied to the selector 43 by the comparator 42, on the other hand, the selector 43 forwards the sampled value Si+1 supplied thereto by way of the terminal a to the multiplier 50.

By the same token, the selector 44 receives the sampled value Si and the first interpolation value Si' supplied by the first interpolation circuit 3 by way of terminals b and a respectively of the selector 43. When a positive control signal is supplied to the selector 43 by the comparator 42, the selector 43 passes on the sampled value Si supplied thereto by way of the terminal b to a multiplier 51. When a negative control signal is supplied to the selector 43 by the comparator 42, on the other hand, the selector 43 forwards the first interpolation value Si' supplied thereto by way of the terminal a to the multiplier 51.

An adder 47 which is used as a subtractor computes the difference between the right-shifted value A/2 supplied thereto by the bit shifter 41 and the value Pi+1 of the PLL-clock-phase signal P supplied thereto by the PLL-clock-phase-signal generator 8, outputting the difference (A/2−Pi+1) to the terminal a of the selector 45.

An adder 48 which is used as a subtractor computes the difference between the constant A supplied thereto by the PLL-clock-phase-signal generator 8 and the value Pi+1 of the PLL-clock-phase signal P supplied thereto also by the PLL-clock-phase-signal generator 8, outputting the difference (A−Pi+1) to the terminal b of the selector 45.

An adder 49 which is used as a subtractor computes the difference between the value Pi+1 of the PLL-clock-phase signal P supplied thereto by the PLL-clock-phase-signal generator 8 and the right-shifted value A/2 supplied thereto by the bit shifter 41, outputting the difference (Pi+1−A/2) to the terminal b of the selector 46.

The selector 45 receives the difference (A/2−Pi+1) and the difference (A−Pi+1) supplied by the adders 47 and 48 by way of terminals a and b respectively of the selector 45. When a positive control signal is supplied to the selector 45 by the comparator 42, the selector 43 passes on the difference (A−Pi+1) supplied thereto by way of the terminal b to the multiplier 50. When a negative control signal is supplied to the selector 45 by the comparator 42, on the other hand, the selector 45 forwards the difference (A/2−Pi+1) supplied thereto by way of the terminal a to the multiplier 50.

By the same token, the selector 46 receives the value Pi+1 of the PLL-clock-phase signal P supplied by the PLL-clock-phase-signal generator 8 and the difference (Pi+1−A/2) supplied by the adder 49 by way of terminals a and b respectively of the selector 46. When a positive control signal is supplied to the selector 46 by the comparator 42, the selector 46 passes on the difference (Pi+1−A/2) supplied thereto by way of the terminal b to the multiplier 51. when a negative control signal is supplied to the selector 46 by the comparator 42, on the other hand, the selector 46 forwards the value Pi+1 of the PLL-clock-phase signal P supplied thereto by way of the terminal a to the multiplier 51.

When an enable signal is supplied to the multiplier 50 by the PLL-clock-phase-signal generator 8, the multiplier 50 computes the product of the value Si+1 or Si' supplied thereto by the selector 43 and the value (A/2−Pi+1) or (A−Pi+1) supplied thereto by the selector 45, outputting the product (Si+1×(A/2−Pi+1)) or (Si'×(A−Pi+1)) to an adder 52.

By the same token, when an enable signal is supplied to the multiplier 51 by the PLL-clock-phase-signal generator 8, the multiplier 51 computes the product of the value Si' or Si supplied thereto by the selector 44 and the value Pi+1 or (Pi+1−A/2) supplied thereto by the selector 46, outputting the product (Si'×Pi+1) or (Si×(Pi+1−A/2)) to the adder 52.

The adder 52 computes the sum of the product (Si+1× (A/2−Pi+1)) or (Si'×(A−Pi+1)) supplied thereto by the multiplier 50 and the product (Si'×Pi+1) or (Si×(Pi+1−A/2)) supplied thereto by the multiplier 51, outputting the sum ((Si+1×(A/2−Pi+1))+(Si'×Pi+1)) or ((Si'×(A−Pi+1))+(Si× (Pi+1−A/2))) a latch circuit 53.

The latch circuit 53 outputs a value stored in a storage device embedded therein to the binary conversion circuit 5 and, at the same time, feeds back the stored value to the phase-error detecting circuit 6 as a second interpolation value Li. When the enable signal is received by the latch circuit 53 from the PLL-clock-phase-signal generator 8, the latch circuit 53 updates the value stored in the storage device with a value supplied thereto from the adder 52.

Figure 7:
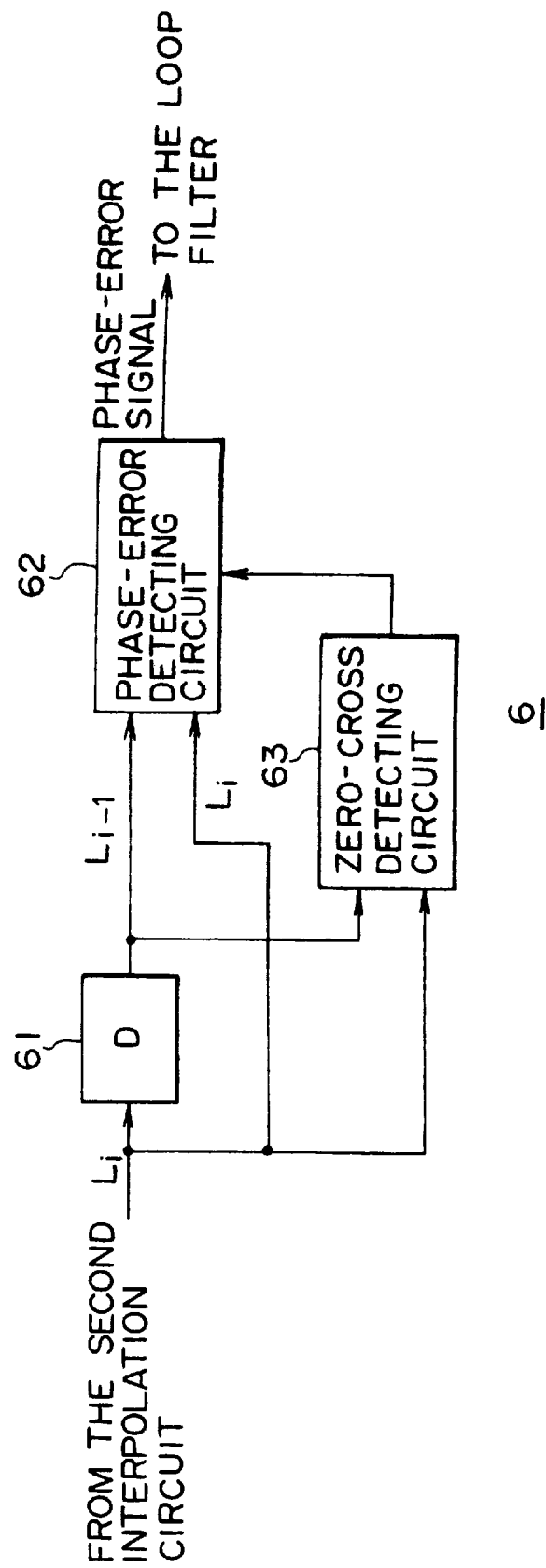
FIG. 7 is a diagram showing a typical configuration of a phase-error detecting circuit 6 employed in the playback apparatus shown in FIG. 4.

FIG. 7 is a diagram showing a typical configuration of the phase-error detecting circuit 6. As shown in the figure, the phase-error detecting circuit 6 includes a delay element 61 for holding the second interpolation value Li supplied thereto by the second interpolation circuit 4 for one system-clock period and outputting the second interpolation value Li at the next system clock to a phase-error computing circuit 62 and a zero-cross detecting circuit 63. That is to say, at a system clock the second interpolation value Li is supplied to the delay element 61 by the second interpolation circuit 4, the delay element 61 outputs the second interpolation value Li−1 held therein so far for one system clock to the phase-error computing circuit 62 and the zero-cross detecting circuit 63.

The zero-cross detecting circuit 63 forms a judgment as to whether or not a zero-cross has occurred in the second interpolation value of the playback signal by comparing the interpolation value Li−1 of the immediately preceding system clock supplied thereto by the delay element 61 and the second interpolation value Li supplied thereto directly by the second interpolation circuit 4.

To put it in detail, the zero-cross detecting circuit 63 finds out whether or not the second interpolation value Li−1 is positive while the second interpolation value Li is negative, or whether or not the second interpolation value Li−1 is negative while the second interpolation value Li is positive. If the second interpolation value Li−1 is found positive while the second interpolation value Li is found negative, the zero-cross detecting circuit 63 forms a judgment that a zero-cross has occurred on the falling edge of the second interpolation value. In this case, a signal indicating such a falling-edge zero-cross is output to the phase-error computing circuit 62. If the second interpolation value Li−1 is found negative while the second interpolation value Li is found positive, on the other hand, the zero-cross detecting circuit 63 forms a judgment that a zero-cross has occurred on the rising edge of the second interpolation value. In this case, a signal indicating such a rising-edge zero-cross is output to the phase-error computing circuit 62.

In accordance with the signal supplied by the zero-cross detecting circuit 63, the phase-error computing circuit 62 computes a phase-error signal from the second interpolation value Li−1 of the immediately preceding system clock supplied thereto by the delay element 61 and the second interpolation value Li supplied directly by the second interpolation circuit 4, outputting the phase-error signal to the loop filter 7.

To put it in detail, when a signal indicating a rising-edge zero-cross is received, the phase-error computing circuit 62 computes the sum (Li−1+Li) of the second interpolation values Li−1 and Li and outputs the sum (Li−1+Li) to the loop filter 7 as a phase-error signal.

When a signal indicating a falling-edge zero-cross is received, on the other hand, the phase-error computing circuit 62 computes the sum (Li−1+Li) of the second interpolation values Li−1 and Li and computes the product of the sum (Li−1+Li) and −1 to give a product (−(Li−1+Li)), outputting the product (−(Li−1+Li)) to the loop filter 7 as a phase-error signal.

Figure 8:
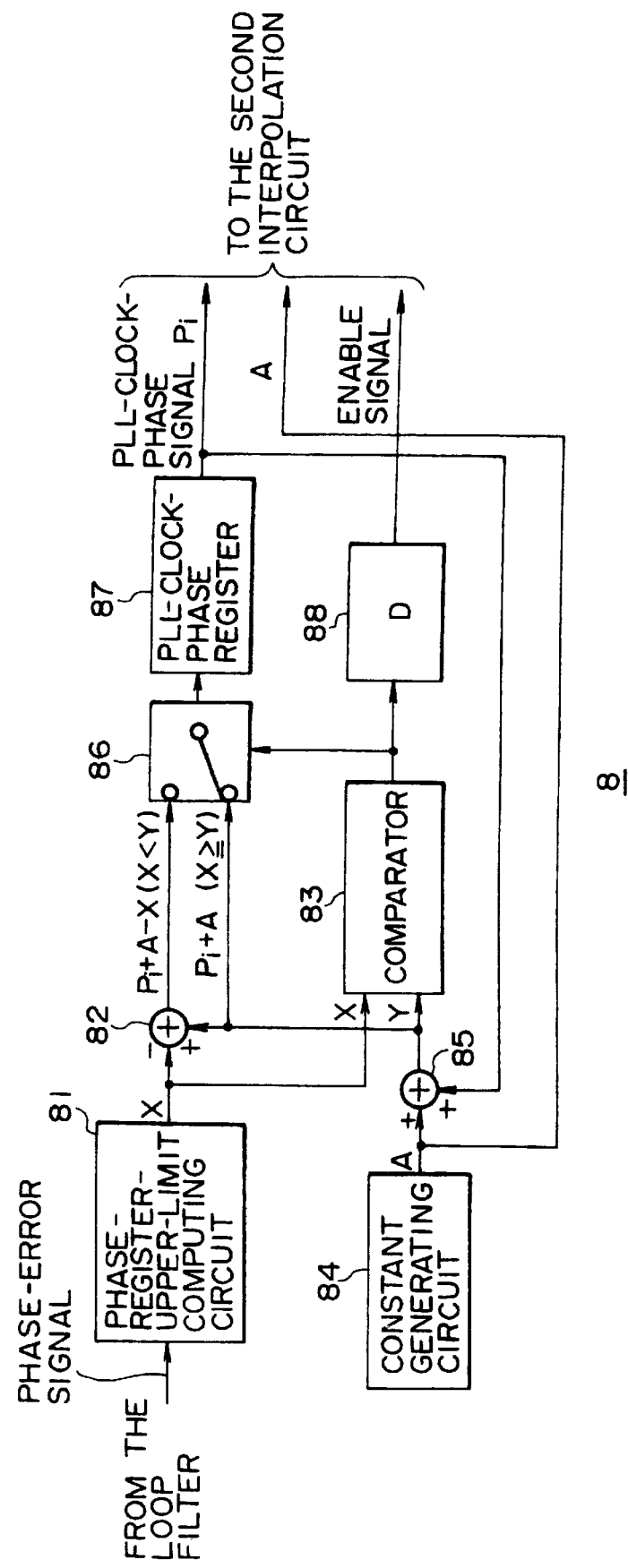
FIG. 8 is a diagram showing a typical configuration of the PLL-clock-phase-signal generator 8 employed in the playback apparatus shown in FIG. 4.

FIG. 8 is a diagram showing a typical configuration of the PLL-clock-phase-signal generator 8. As shown in the figure, the PLL-clock-phase-signal generator 8 includes a phase-register-upper-limit computing circuit 81, which also operates according to the system clock signal, for computing an upper-limit value X (or a second constant) of a value held in a PLL-clock-phase register 87 in accordance with the value of the phase-error signal supplied thereto by way of the loop filter 7. The upper-limit value X is then output to an adder (used as a subtractor) 82 and a comparator 83.

A constant generating circuit 84 generates the predetermined digital constant value A cited earlier to be supplied to an adder 85 and the second interpolation circuit 4. As described before, the constant A is also referred to as a first constant.

The adder 85 computes the sum of the constant A supplied thereto by the constant generating circuit 84 and the value Pi of the PLL-clock-phase signal P supplied by the PLL clock phase register 87, outputting the sum (Pi+A) to the adder 82, the comparator 83 and a switch circuit 86.

The adder 82, which is used as a subtractor as described earlier, computes the difference between the sum (Pi+A) supplied thereto by the adder 85 and the upper-limit value X supplied by the phase-register-upper-limit computing circuit 81, outputting the difference (Pi+A−X) to the switch circuit 86.

The comparator 83 compares the sum (Pi+A) supplied thereto by the adder 85 with the upper-limit value X supplied by the phase-register-upper-limit-computing circuit 81 by computing the difference (Pi+A−X) between them. The comparator 83 then forms a judgment as to whether the difference (Pi+A−X) is positive or negative.

If the computed difference (Pi+A−X) is found positive, that is, if (Pi+A)>X, a first control signal is supplied by the comparator 83 to the switch circuit 86 and a delay element 88. If the computed difference (Pi+A−X) is found equal to or smaller than zero, that is, if (Pi+A)≦X, on the other hand, a second control signal is supplied by the comparator 83 to the switch circuit 86 and the delay element 88.

Receiving the first control signal indicating ((Pi+A)>X), the switch circuit 86 passes on the difference (Pi+A−X) supplied thereto by the adder 82 to the PLL-clock-phase register 87. If the second control signal indicating ((Pi+A) ≦X) is received, on the other hand, the switch circuit 86 forwards the sum (Pi+A) supplied thereto by the adder 85 to the PLL-clock-phase register 87.

Operating in accordance with the system clock signal, the PLL-clock-phase register 87 stores the difference (Pi+A−X) or the sum (Pi+A) supplied thereto by the switch circuit 86 in a storage device embedded therein and outputs the value (Pi+A−X) or (Pi+A) to the adder 85 and the second interpolation circuit 4 as a value Pi of the PLL-clock-phase signal P.

The delay element 88 holds the control signal supplied thereto by the comparator 83 for one system-clock period and then passes on the control signal to the second interpolation circuit 4 and the binary conversion circuit 5 as an enable signal.

As described above, the control signal supplied by the comparator 83 is passed on by the delay element 88 to the second interpolation circuit 4 and the binary conversion circuit 5 as an enable signal. In particular, if a phase zero-cross is detected in the PLL-clock-phase signal P between the points of time ti−1 and ti, that is, if the comparator 83 finds out that the sum (Pi+A) exceeds the upper-limit value X at the point of time ti, the updating and processing including the binary conversion of the second interpolation value are carried out accompanying this phase zero-cross of the PLL-clock-phase signal P.

As described above, the PLL-clock-phase-signal generator 8 operates in accordance with the system clock signal, adding the constant A to the value Pi of the PLL-clock-phase signal P at every system clock. As the sum (Pi+A) exceeds the upper-limit value X, the upper-limit value A is subtracted from the sum (Pi+A) to result in the difference (Pi+A−X). In this way, in each system clock, the PLL-clock-phase-signal generator 8 derives the value Pi of the PLL-clock-phase signal P having a saw-tooth waveform with a maximum amplitude equal to A, the first constant, and a slope A/Δt where Δt is the period of the system clock signal.

Next, the operation of the embodiment to compute a first interpolation value from sampled values is explained.

In the first interpolation circuit 3 shown in FIG. 5, a sampled value Si−1 is delayed by three system-clock periods by the delay elements 21, 24 and 28 before arriving at the adder 29.

The bit shifter 23 shifts the sampled value Si+1 supplied thereto by the delay element 21 by three bits toward the MSB and outputs the left-shifted value 8×Si+1 to the adder 22 which is used for computing the sum of the sampled value Si+1 and the left-shifted 8×Si−1 and outputting the sum (9×Si+1) to the adder 25 and the delay element 26. The delay element 26 holds the sum (9×Si+1) for one system-clock period and outputs a previous sum (9×Si) held therein so far for one system-clock period to the adder 25.

The adder 25 adds the sum (9×Si) supplied thereto by the delay element 26 to the sum (9×Si+1) supplied thereto by the adder 22 and outputs the result of the addition (9×Si+9×Si+ 1) to the adder 27.

On the other hand, the adder 29 computes the sum of the sampled value Si+2 supplied thereto by the A/D converter 2 and the sampled value Si−1 preceding the sampled value Si+2 by three system-clock periods, outputting the sum (Si−1+Si+2) to the adder 27.

The adder 27 which is used as a subtractor computes the difference between the sum (9×Si+9×Si+1) supplied thereto by the adder 25 and the sum (Si−1+Si+2) supplied thereto by the adder 29 and outputs the difference (Si−1−9×Si−9×Si+ 1+Si+2) to the bit shifter 30.

The bit shifter 30 shifts the difference (Si−1−9×Si−9×Si+ 1+Si+2) supplied thereto by the adder 27 by four bits toward the LSB and outputs the right-shifted value (Si−1−9×Si−9× Si+1+Si+2)/16 to the second interpolation circuit 4 as the first interpolation value Si'. It should be noted that, since the bit shifter 30 merely shifts the difference toward the LSB, the less significant bits are truncated.

When the first interpolation value Si' is supplied to the second interpolation circuit 4, the delay element 21 also supplies a sample value Si+1 of the immediately preceding system clock to the second interpolation circuit 4. At the same time, the delay element 24 supplies a sample value Si preceding the first interpolation value Si' by two system-clock periods to the second interpolation circuit 4 as well.

In this way, the first interpolation circuit 3 carries out interpolation based on a third-order function using the four sampled values Si−1, Si, Si+1 and Si+2 as base points in order to find the first interpolation value Si', outputting the first interpolation value Si' along with the two sampled values Si and Si+1 to the second interpolation circuit 4.

It should be noted that the bit shifters 23 and 30 are each merely wired so that each bit of data supplied thereto is output as a shifted bit corresponding to the bit. As a result, bit-shifted data is output from the bit shifter at the same clock at which next data is supplied to the bit shifter.

A gate propagation delay occurs in each of the adders 22, 25, 27 and 29 employed in the first interpolation circuit 3. However, there is no problem in particular as long as the circuit is not operated at a very high speed, a speed of such an order that the gate propagation delay can not be ignored. It should be noted that, if the circuit is operated at such a high speed that the gate propagation delay can not be ignored, delay elements need to be provided to adjust timing at circuit portions to proper timing that takes the gate propagation delays into consideration.

It should be noted that the first interpolation circuit 3 employed in the present embodiment is not a configuration element of the PLL so that the time it takes to compute a first interpolation value does not have an effect on the processing speed of the PLL.

Next, the operation of the PLL in the present embodiment is explained.

First of all, the zero-cross detecting circuit 63 employed in the phase-error detecting circuit 6 receives the second interpolation value Li−1 of the playback signal for the immediately preceding system clock from the delay element 61 and the second interpolation value Li for the present system clock from the second interpolation circuit 4. The zero-cross detecting circuit 63 finds out whether or not the second interpolation value Li−1 is negative while the second interpolation value Li is positive. If the second interpolation value Li−1 is found negative while the second interpolation value Li is found positive, the zero-cross detecting circuit 63 forms a judgment that a zero-cross has occurred on the rising edge of the second interpolation value. In this case, a signal indicating such a rising-edge zero-cross is output to the phase-error computing circuit 62.

When a signal indicating a rising-edge zero-cross is received, the phase-error computing circuit 62 computes the sum of the second interpolation value Li−1 of the immediately preceding system clock and the current second interpolation value Li and outputs the sum (Li−1+Li) to the loop filter 7 as a phase-error signal.

Figure 11A:
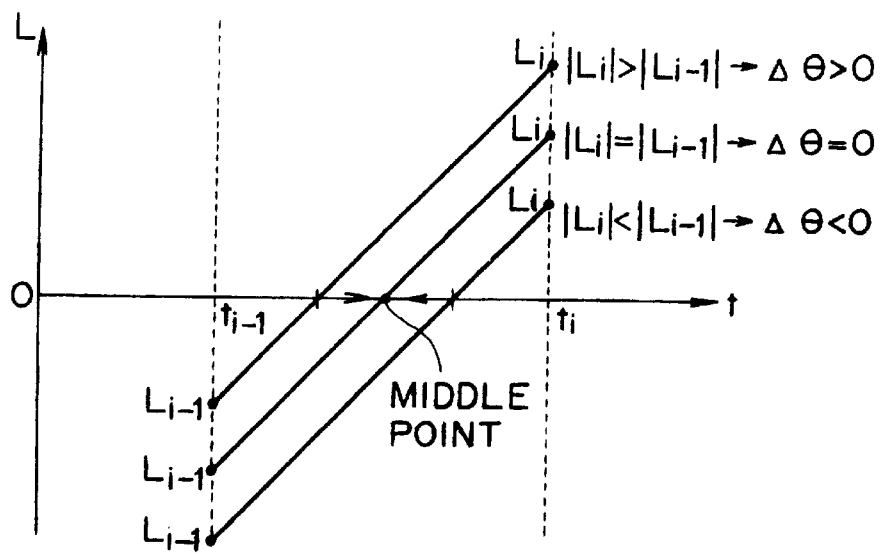
FIGS. 11A and 11B are diagrams showing relations between the second interpolation values Li−1 and Li of a playback signal and the value of a phase-error signal Δθ.

FIG. 11A shows relations between the second interpolation values Li−1 and Li at the time the rising-edge zero-cross is detected and the value of the phase-error signal $\Delta\theta$. If the absolute value of the present second interpolation value Li is greater than the absolute value of the previous second interpolation value Li−1, the value of the phase-error signal $\Delta\theta$ is positive. If the absolute value of the present second interpolation value Li is smaller than the absolute value of the previous second interpolation value Li−1, on the other hand, the value of the phase-error signal $\Delta\theta$ is negative.

By the same token, the zero-cross detecting circuit 63 finds out whether or not the second interpolation value Li−1 is positive while the second interpolation value Li is negative. If the second interpolation value Li−1 is found positive while the second interpolation value Li is found negative, the zero-cross detecting circuit 63 forms a judgment that a zero-cross has occurred on the falling edge of the second interpolation value. In this case, a signal indicating such a falling-edge zero-cross is output to the phase-error computing circuit 62.

When a signal indicating a falling-edge zero-cross is received, the phase-error computing circuit 62 computes the sum of the second interpolation value Li−1 of the immediately preceding system clock and the current second interpolation value Li and computes the product of the sum (Li−1+Li) and −1 to give a product (−(Li−1+Li)), outputting the product (−(Li−1+Li)) to the loop filter 7 as a phase-error signal.

Figure 11B:
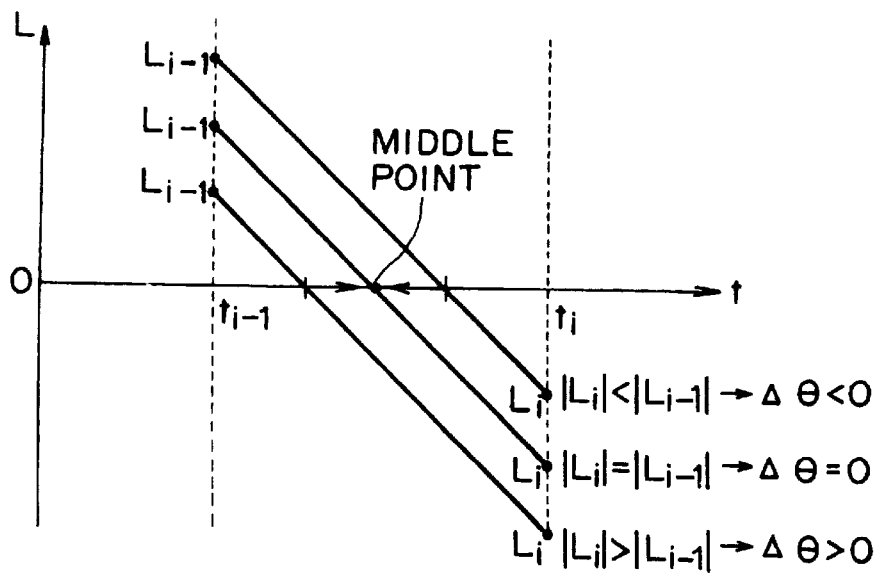

FIG. 11B shows relations between the second interpolation values Li−1 and Li at the time the falling-edge zero-cross is detected and the value of the phase-error signal $\Delta\theta$. If the absolute value of the present second interpolation value Li is greater than the absolute value of the previous second interpolation value Li−1, the value of the phase-error signal $\Delta\theta$ is positive. If the absolute value of the present second interpolation value Li is smaller than the absolute value of the previous second interpolation value Li−1, on the other hand, the value of the phase-error signal $\Delta\theta$ is negative.

It should be noted that the present second interpolation value Li and the immediately preceding second interpolation value Li−1 having the same sign indicate that a zero-cross did not occur. In this case, the zero-cross detecting circuit 63 does not output any signal to the phase-error computing circuit 62 in particular. When the zero-cross detecting circuit 63 does not supply a signal indicating a zero-cross to the phase-error computing circuit 62, the phase-error computing circuit 62 outputs a zero to the loop filter 7 as a phase-error signal.

Let a second interpolation value L be obtained by applying a linear interpolation technique to the second interpolation value Li−1 at the point of time ti−1 and the second interpolation value Li at the point of time ti. The value L becomes zero at a point of time t0 earlier or later than a middle point between the points of time ti−1 and ti. As shown in FIGS. 11A and 11B, if the point of time t0 is earlier than the middle point between the points of time ti−1 and ti, a positive phase-error signal is supplied to the loop filter 7 be the zero-cross a rising-edge zero-cross or a falling-edge zero-cross. If the point of time t0 is later than the middle point between the points of time ti−1 and ti, on the other hand, a negative phase-error signal is supplied to the loop filter 7 regardless of whether the zero-cross is a rising-edge zero-cross or a falling-edge zero-cross.

It should be noted that the PLL-clock-phase signal P generated by the PLL-clock-phase-signal generator 8 is not supplied directly to the phase-error detecting circuit 6. Instead, the PLL-clock-phase signal P generated by the PLL-clock-phase-signal generator 8 is supplied indirectly to the phase-error detecting circuit 6 by way of the second interpolation circuit 4. It is worth noting, however, that if a zero-cross does not occur in the PLL-clock-phase signal P, the second interpolation value of the playback signal supplied from the second interpolation circuit 4 to the phase-error detecting circuit 6 is not updated by the second interpolation circuit 4. In this case, the phase-error detecting circuit 6 outputs a zero to the loop filter 7 as a phase-error signal because the second interpolation value Li and the immediately preceding second interpolation value Li−1 have the same sign as described above, indirectly reflecting the state of the PLL-clock-phase signal P in the operation thereof.

Then, the loop filter 7 outputs the phase-error signal to the PLL-clock-phase-signal generator 8 after eliminating high-frequency components from the phase-error signal. In this way, the loop filter 7 avoids a positive feedback with a much lagging phase in the high-frequency zone in the PLL operation and, at the same time, reduces the number of intersymbol interference components and the amount of noise included in the playback signal.

Subsequently, the phase-register-upper-limit computing circuit 81 employed in the PLL-clock-phase-signal generator 8 computes an upper-limit value X of a value held in the PLL-clock-phase register 87 in accordance with the value of the phase-error signal supplied thereto by the phase-error detecting circuit 6 by way of the loop filter 7. The upper-limit value X is then output to the adder 82 (which is used as a subtractor) and the comparator 83.

The comparator 83 compares the sum (Pi+A) supplied thereto by the adder 85 with the upper-limit value X supplied by the phase-register-upper-limit computing circuit 81 by computing the difference (Pi+A−X) between them. Then, the comparator 83 finds out whether the computed difference (Pi+A−X) is positive or negative. If the computed difference (Pi+A−X) is found positive, that is, if (Pi+A)>X, a first control signal is supplied by the comparator 83 to the switch circuit 86. Receiving the first control signal indicating ((Pi+A)>X), the switch circuit 86 passes on the difference (Pi+A−X) supplied thereto by the adder 82 to the PLL-clock-phase register 87 to be stored therein.

If the computed difference (Pi+A−X) is found equal to or smaller than zero, that is, if (Pi+A)≦X, on the other hand, a second control signal is supplied by the comparator 83 to the switch circuit 86. Receiving the second control signal indicating ((Pi+A)≦X), the switch circuit 86 forwards the sum (Pi+A) supplied by the adder 85 to the PLL-clock-phase register 87 to be stored therein.

The PLL-clock-phase register 87 stores the difference (Pi+A−X) or the sum (Pi+A) supplied thereto by the switch circuit 86 in a storage device embedded therein and outputs the difference (Pi+A−X) or the sum (Pi+A) to the second interpolation circuit 4 as a value Pi of the PLL-clock-phase signal P.

Figure 9:
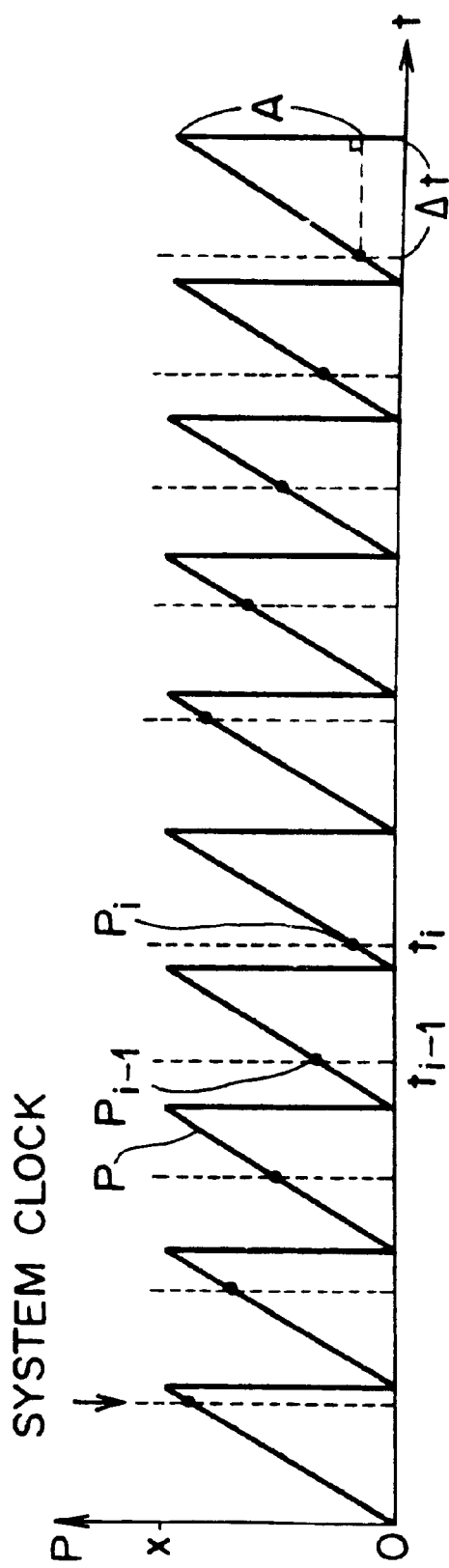
FIG. 9 is a diagram showing an example of a PLL-clock-phase signal P.
Figure 10:
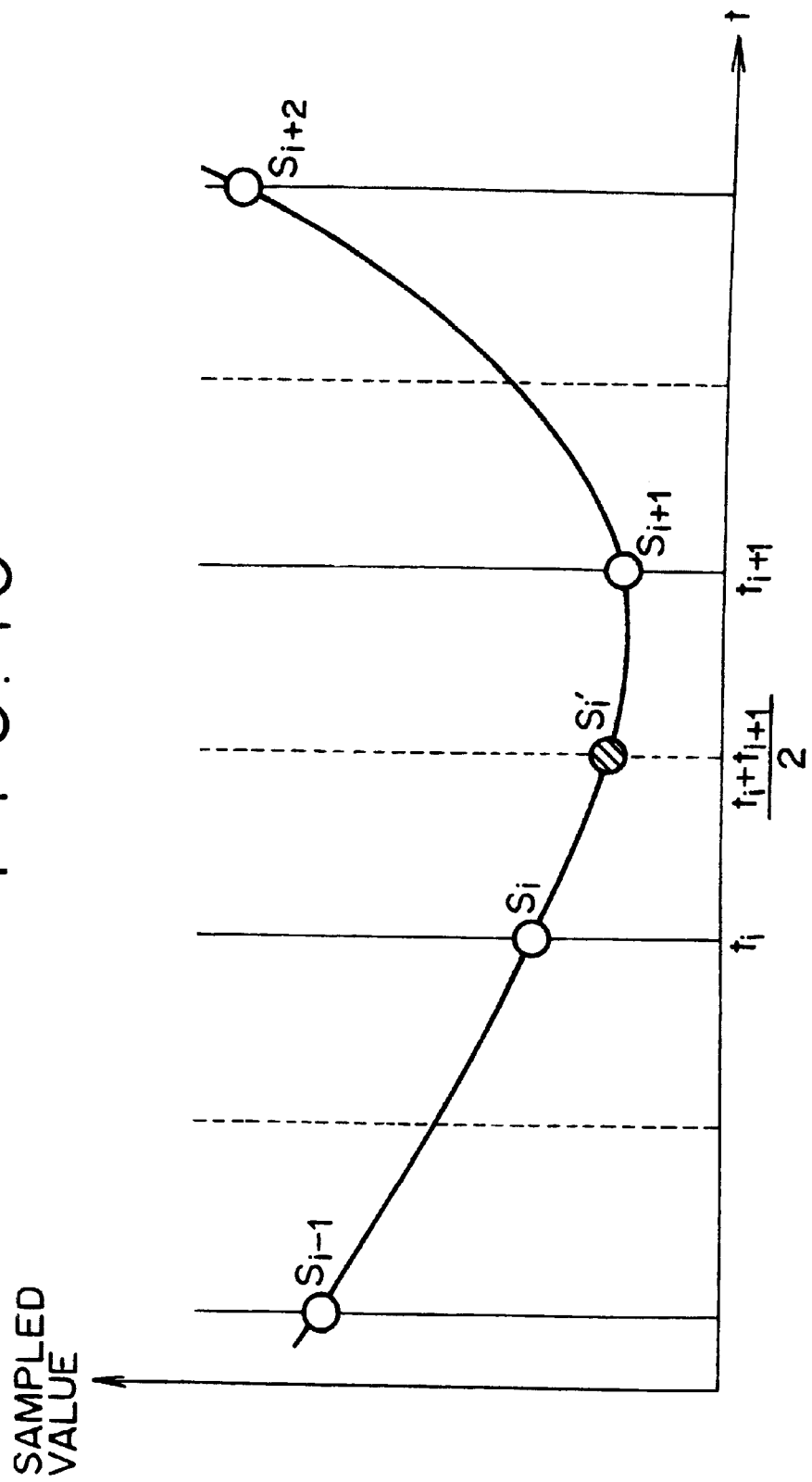
FIG. 10 is a diagram showing an example of a first interpolation value found by using an interpolation technique based on a third-order function.

In this way, the PLL-clock-phase-signal generator 8 in each system clock derives the value Pi of the PLL-clock-phase signal P having a saw-tooth waveform like the one shown in FIG. 9 and outputs the value Pi to the second interpolation circuit 4. At the same time, the PLL-clock-phase-signal generator 8 adjusts the frequency of the PLL-clock-phase signal P having a virtual saw-tooth waveform by adjusting the upper-limit value X in accordance with the phase-error signal.

Then, the second interpolation circuit 4 detects a middle point of time at which the phase of the virtual PLL-clock-phase signal P is zero from two consecutive values Pi and Pi+1 of the PLL-clock-phase signal P at the points of time ti and ti+1 respectively. It should be noted that, at the middle point of time, the phase of the PLL-clock-phase signal (strictly speaking, the value of the virtual PLL-clock-phase signal P) is zero. That is to say, at the middle point of time, a phase-zero-cross occurs. The value of the playback signal at the time the phase-zero-cross occurs, that is, the second interpolation value of the playback signal, is then calculated by the second interpolation circuit 4 by means of the linear-interpolation technique using the sampled value Si+1 or Si and the first interpolation value Si' supplied thereto by the first interpolation circuit 3 as base points. That is to say, the second interpolation value is computed by selecting either a pair of values Si+1 and Si' or Si and Si' as base points.

To put it in detail, if the phase zero-cross of the PLL-clock-phase signal P occurs in the period ((ti+ti+1)/2 to ti+1), the second interpolation value is computed by using the linear-interpolation technique with the sampled value Si+1 and the first interpolation value Si' used as base points. If the phase zero-cross of the PLL-clock-phase signal P occurs in the period (ti to (ti+ti+1)/2), on the other hand, the second interpolation value is computed by using the linear-interpolation technique with the sampled value Si and the first interpolation value Si' used as base points.

Figure 12:
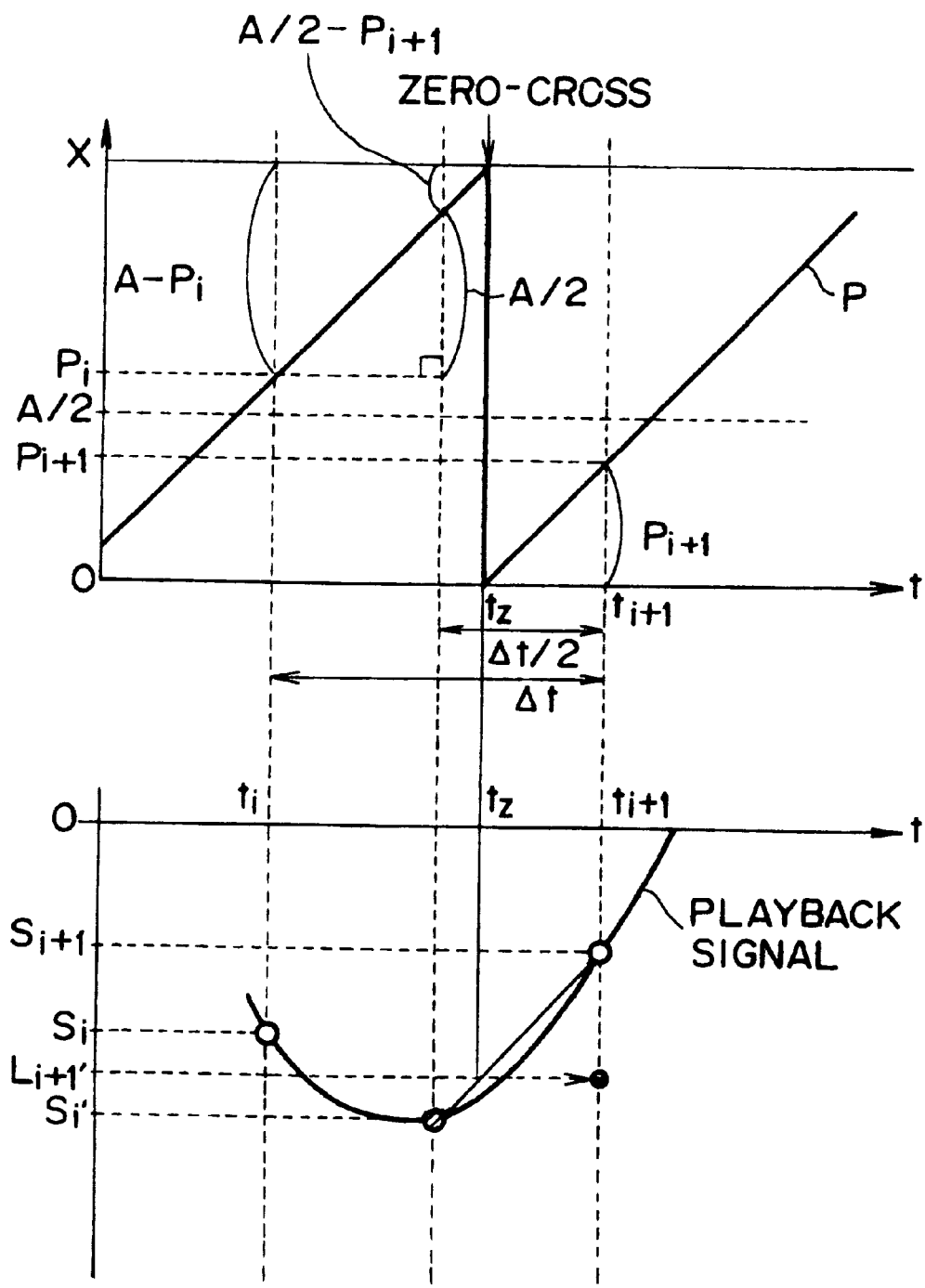
FIG. 12 is an explanatory diagram showing how a second interpolation value of a playback signal is found.

Let tz be a point of time in the period ((ti+ti+1)/2 to ti+1) at which a phase-zero-cross occurs in the virtual PLL-clock-phase signal P. Since the slope of the saw-tooth waveform of the PLL-clock-phase signal P is fixed as shown in FIG. 12, the ratio of (tz−(ti+ti+1)/2) to (ti+1−tz) is equal to the ratio of (A/2−Pi+1) to Pi+1, or ((tz−(ti+ti+1)/2):(ti+1−tz)) is equal to ((A/2−Pi+1):Pi+1).

In addition, since a second interpolation value Li+1' is calculated by adopting the linear-interpolation technique with the sampled value Si+1 and the first interpolation value Si' used as base points, the ratio of (tz−(ti+ti+1)/2) to (ti+1−tz) is equal to the ratio of (Li+1'−Si') to (Si+1−Li+1'), or ((tz−(ti+ti+1)/2):(ti+1−tz)) is equal to ((Li+1'−Si'):(Si+1−Li+1')).

Accordingly, the ratio of (A/2−Pi+1) to Pi+1 is equal to the ratio of (Li+1'−Si') to (Si+1−Li+1'), or ((A/2−Pi+1):Pi+1) is equal to ((Li+1'−Si'):(Si+1−Li+1')). The following equation thus holds true:

$$(A/2-Pi+1)/Pi+1=(Li+1'-Si')/(Si+1-Li+1')$$

Rewriting the above equation results in an equation expressing the second interpolation value Li+1' of the playback signal as follows.

$$Li+1'=(Si+1\times(A/2-Pi+1)+Si'\times Pi+1)/(A/2)$$

Figure 13:
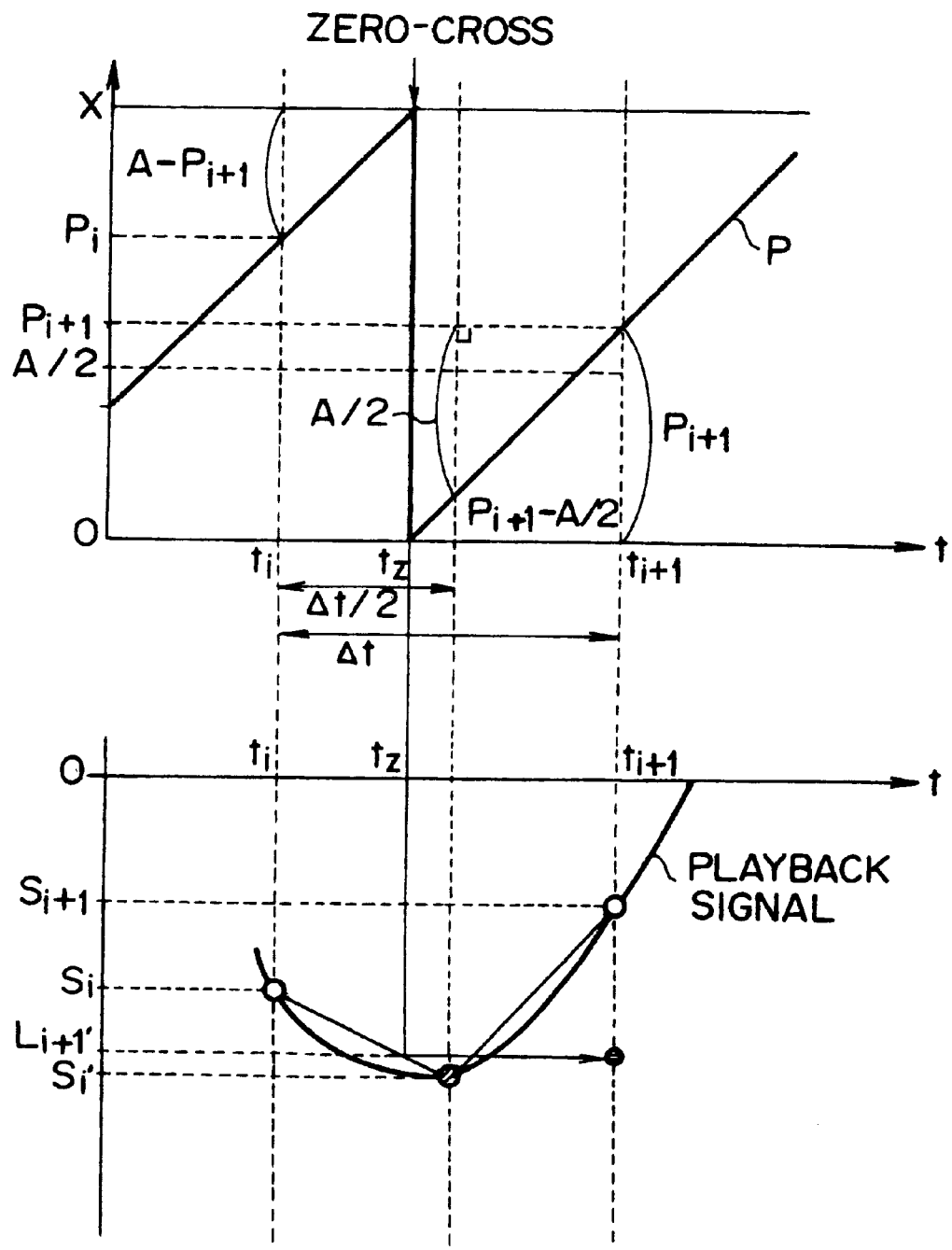
FIG. 13 is an explanatory diagram showing how a second interpolation value of a playback signal is found.

On the other hand, let the phase zero-cross occur in the PLL-clock-phase signal P at a point of time tz in the period ((ti to (ti+ti+1)/2). By the same token, since the slope of the saw-tooth waveform of the PLL-clock-phase signal P is fixed as shown in FIG. 13, the ratio of (tz−ti) to ((ti+ti+1)/2−tz) is equal to the ratio of (A−Pi+1) to (Pi+1−A/2), or ((tz−ti):((ti+ti+1)/2−tz)) is equal to ((A−Pi+1):(Pi+1−A/2)).

In addition, since a second interpolation value Li+1' is calculated by adopting the linear-interpolation technique with the sampled value Si and the first interpolation value Si' used as base points, the ratio of (tz−ti) to ((ti+ti+1)/2−tz) is equal to the ratio of (Si−Li+1') to (Li+1'−Si'), or ((t1−tz):(tz−ti−1)) is equal to ((Si−Li+1'):(Li+1'−Si')).

Accordingly, the ratio of (A−Pi+1) to (Pi+1−A/2) is equal to the ratio of (Si−Li+1') to (Li+1'−Si'), or ((A−Pi+1):(Pi+1−A/2)) is equal to ((Si−Li+1'):(Li+1'−Si')). The following equation thus holds true:

$$(A-Pi+1)/(Pi+1-A/2)=(Si-Li+1')/(Li+1'-Si')$$

Rewriting the above equation results in an equation expressing the second interpolation value Li+1' of the playback signal as follows.

$$Li+1'=(Si'\times(A-Pi+1)+Si\times(Pi+1-A/2))/(A/2)$$

To sum up, if a phase-zero-cross occurs in the virtual PLL-clock-phase signal P at a point of time in the period ((ti+ti+1)/2 to ti+1), the second interpolation value Li+1' is expressed by the following equation:

$$Li+1'=(Si+1\times(A/2-Pi+1)+Si'\times Pi+1)/(A/2)$$

If a phase-zero-cross occurs in the virtual PLL-clock-phase signal P at a point of time in the period ((ti to (ti+ti+1)/2), on the other hand, the second interpolation value Li+1' is expressed by the following equation:

$$Li+1'=(Si'\times(A-Pi+1)+Si\times(Pi+1-A/2))/(A/2)$$

In either case, the numerator (Si+1×(A/2−Pi+1)+Si'×Pi+1) or (Si'×(A−Pi+1)+Si×(Pi+1−A/2)) of the ratio on the right-hand side of each of the above equations is calculated by the second interpolation circuit 4 in order to find the second interpolation value Li+1' as follows.

First of all, the bit shifter 41 shifts the constant A supplied thereto by the PLL-clock-phase signal generator 8 toward the LSB by one bit to produce a constant A/2 which is then supplied to the comparator 42.

The comparator 42 compares the right-shifted value A/2 supplied thereto by the bit shifter 41 with a value Pi+1 of the PLL-clock-phase signal P supplied thereto by the PLL-clock-phase-signal generator 8 by computing the difference (Pi+1−A/2) between them. The comparator 42 also finds out whether the computed difference (Pi+1−A/2) is positive or negative. If the computed difference (Pi+1−A/2) is found positive, that is, if Pi+1>A/2 indicating that a phase zero-cross of the PLL phase clock signal P occurs in the period (ti to (ti+ti+1)/2), a predetermined positive control signal is supplied to the selectors 43 to 46. If the computed difference (Pi+1−A/2) is found negative or equal to zero, that is, if Pi+1≦A/2 indicating that a phase zero-cross of the PLL phase clock signal P occurs in the period ((ti+ti+1)/2 to ti+1), on the other hand, a predetermined negative control signal is supplied to the selectors 43 to 46.

If a phase-zero-cross occurs in the virtual PLL-clock-phase signal P at a point of time in the period ((ti+ti+1)/2 to ti+1), the selector 43 outputs the sampled value Si+1 to the multiplier 50 and the selector 45 outputs the difference (A/2−Pi+1) computed by the adder 47 also to the multiplier 50. The multiplier 50 computes the product of the sampled value Si+1 and the difference (A/2−Pi+1), outputting the product (Si+1×(A/2−Pi+1)) to the adder 52 only if an enable signal is supplied by the PLL-clock-phase-signal generator 8 to the multiplier 50.

In the mean time, the selector 44 outputs the first interpolation value Si' to the multiplier 51 and the selector 46 outputs the value Pi+1 of the PLL-clock-phase signal P also to the multiplier 51. The multiplier 51 computes the product of the first interpolation value Si' and the value Pi+1, outputting the product (Si'×Pi+1) to the adder 52 only if an enable signal is supplied by the PLL-clock-phase-signal generator 8 to the multiplier 51.

The adder 52 computes the sum of the product (Si+1×(A/2−Pi+1)) supplied thereto by the multiplier 50 and the product (Si'×Pi+1) supplied thereto by the multiplier 51, outputting the sum ((Si+1×(A/2−Pi+1))+(Si'×Pi+1)) to the latch circuit 53.

The latch circuit 53 outputs the value stored in the storage device thereof to the binary conversion circuit 5 and, at the same time, feeds back the value to the phase-error detecting circuit 6 as a second interpolation value Li. When an enable signal is received by the latch circuit 53 from the PLL-clock-phase-signal generator 8, the latch circuit 53 updates the value stored in the storage device with the sum ((Si+1×(A/2−Pi+1))+(Si'×Pi+1)) supplied thereto by the adder 52.

If a phase-zero-cross occurs in the virtual PLL-clock-phase signal P at a point of time in the period (ti to (ti+ti+1)/2), on the other hand, the selector 43 outputs the first interpolation value Si' to the multiplier 50 and the selector 45 outputs the difference (A−Pi+1) computed by the adder 48 also to the multiplier 50. The multiplier 50 computes the product of the first interpolation value Si' and the difference (A−Pi+1), outputting the product (Si'×(A−Pi+1)) to the adder 52 only if an enable signal is supplied by the PLL-clock-phase-signal generator 8 to the multiplier 50.

In the mean time, the selector 44 outputs the sampled value Si to the multiplier 51 and the selector 46 outputs the difference (Pi+1−A/2) supplied thereto by the adder 49 also to the multiplier 51. The multiplier 51 computes the product of the sampled value Si and the difference (Pi+1−A/2), outputting the product (Si×(Pi+1−A/2)) to the adder 52 only if an enable signal is supplied by the PLL-clock-phase-signal generator 8 to the multiplier 51.

The adder 52 computes the sum of the product (Si'×(A−Pi+1)) supplied thereto by the multiplier 50 and the product (Si×(Pi+1−A/2)) supplied thereto by the multiplier 51, outputting the sum ((Si'×(A−Pi+1))+(Si×(Pi+1−A/2))) to the latch circuit 53.

The latch circuit 53 outputs the value stored in the storage device thereof to the binary conversion circuit 5 and, at the same time, feeds back the value to the phase-error detecting circuit 6 as a second interpolation value Li. When an enable signal is received by the latch circuit 53 from the PLL-clock-phase-signal generator 8, the latch circuit 53 updates the value stored in the storage device with the sum ((Si'×(A−Pi+1))+(Si×(Pi+1−A/2))) supplied thereto by the adder 52.

Figure 14:
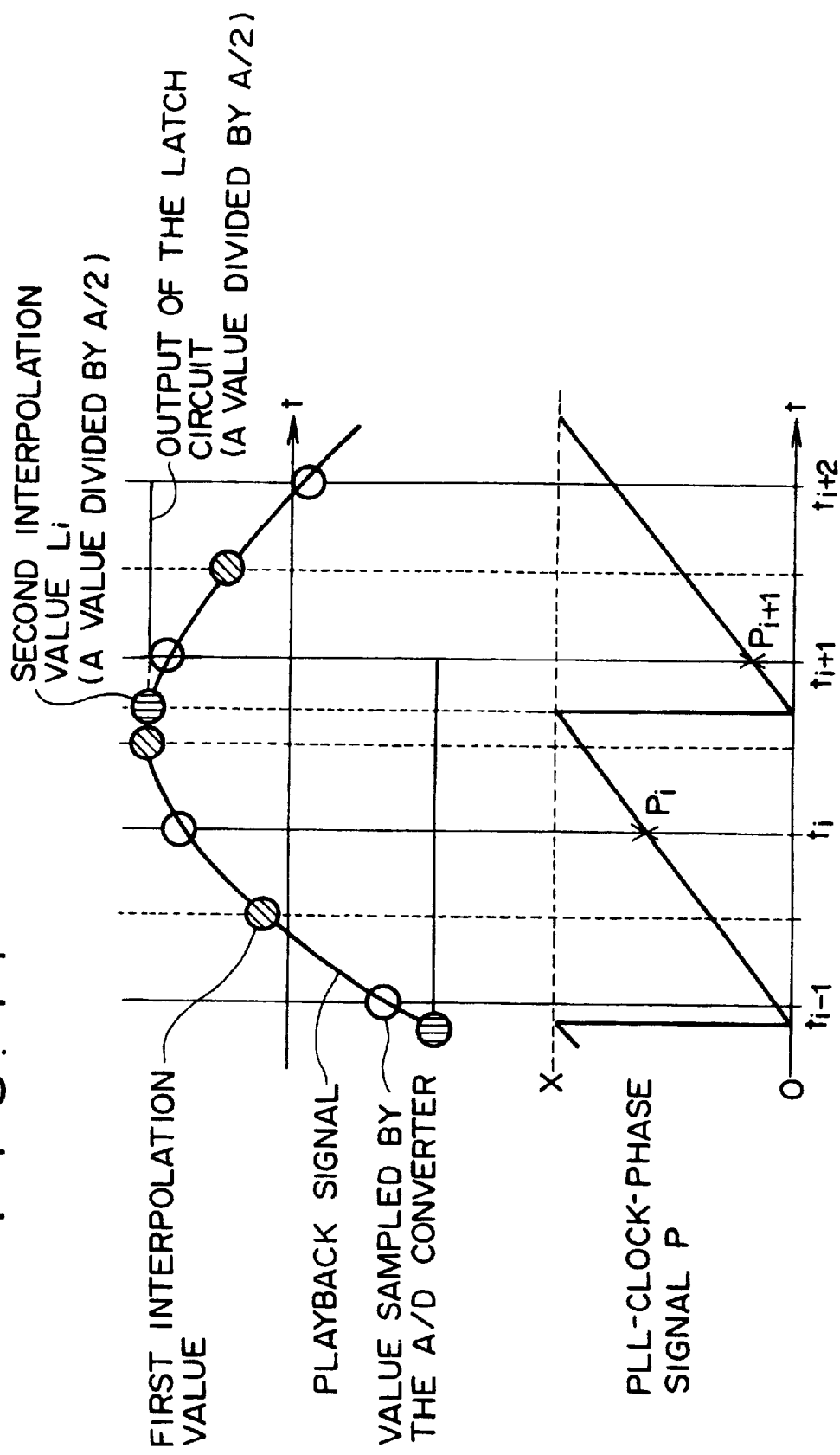
FIG. 14 is a diagram showing examples of first and second interpolation values of a playback signal.

FIG. 14 is a diagram showing an example of the second interpolation value Li output by the latch circuit 53. If a phase-zero-cross has occurred in the PLL-clock-phase signal P at a point of time between the points of time ti and ti+1, the second interpolation circuit 4 updates the second interpolation value stored in the latch circuit 53 with the sum computed by the adder 52 by using the values Pi and Pi+1 (each denoted by an×mark in the figure) of the PLL-clock-phase signal P supplied by the PLL-clock-phase-signal generator 8 at the points of time ti and ti+1 respectively as described above. If a phase-zero-cross does not occur in the PLL-clock-phase signal P at a point of time during a system-clock period, on the other hand, the second interpolation circuit 4 does not update the second interpolation value. For example, between the points of time ti−1 and ti and between the points of time ti+1 and ti+2 shown in FIG. 14, a phase zero-cross does not occur. During those periods, the second interpolation value is not updated.

As described above, the second interpolation circuit 4 computes the value of the expression ((Si+1×(A/2−Pi+1))+(Si'×Pi+1)) or ((Si'×(A−Pi+1))+(Si×(Pi+1−A/2))) as a second interpolation value Li+1, that is, Li+1=((Si+1×(A/2−Pi+1))+(Si'×Pi+1)) or ((Si'×(A−Pi+1))+(Si×(Pi+1−A/2))), and outputs the second interpolation value Li+1 to the binary conversion circuit 5 at the following stage and, at the same time, feeds back the second interpolation value Li+1 to the phase-error detecting circuit 6. Then, the binary conversion circuit 5 computes the finally desired second interpolation value Li' which is equal to Li/(A/2) by bit-shifting the second interpolation value Li by as many bits as required to divide the second interpolation value Li by the constant A/2.

In this way, no processing circuit is required for carrying out the division of the second interpolation value Li by the constant A/2, allowing the cost to be reduced.

It should be noted that, if a phase-zero-cross does not occur in the PLL-clock-phase signal P, the enable signal is not output by the PLL-clock-phase-signal generator 8 to the second interpolation circuit 4. In this case, the latch circuit 53 outputs the second interpolation value of the immediately preceding system clock as it is. Since the binary conversion circuit 5 carries out processing in synchronization with the enable signal generated by the PLL-clock-phase-signal generator 8, the second interpolation value of the immediately preceding system clock output as it is by the latch circuit 53 is not processed by the binary conversion circuit 5 for the second time, that is, the same second interpolation value of two consecutive system clocks is never processed twice.

As described above, in the present invention, the phase-error detecting circuit 6 detects a phase error, that is a deviation of a zero-cross of the second interpolation value occurring in the playback signal from a middle point of two consecutive system clocks. The PLL-clock-phase-clock-signal generator 8 uses the deviation to adjust the frequency of the virtual PLL-clock-phase signal P in order to adjust the timing for calculating a second interpolation value, that is, the time at which the phase of the PLL-clock-phase signal P becomes zero. In this way, the zero-cross of the second interpolation value occurring in the playback signal can be brought to a point of time closer to the middle point.

By bringing the zero-cross of the second interpolation value occurring in the playback signal to a point of time closer to the middle point, the binary conversion circuit 5 can carry out binary conversion processing with a high degree accuracy even if the zero-cross of the second interpolation value occurring in the playback signal deviates from the middle point to a certain degree due to, among other causes, intersymbol interference and noise.

It should be noted that, in the present embodiment, all circuits composing the PLL such as the second interpolation circuit 4 each operate in synchronization with the system clock signal. That is to say, a circuit operating at a clock frequency higher than that of the system clock signal is not required even if high-speed processing is to be carried out, allowing a low-cost playback apparatus to be implemented.

Figure 15:
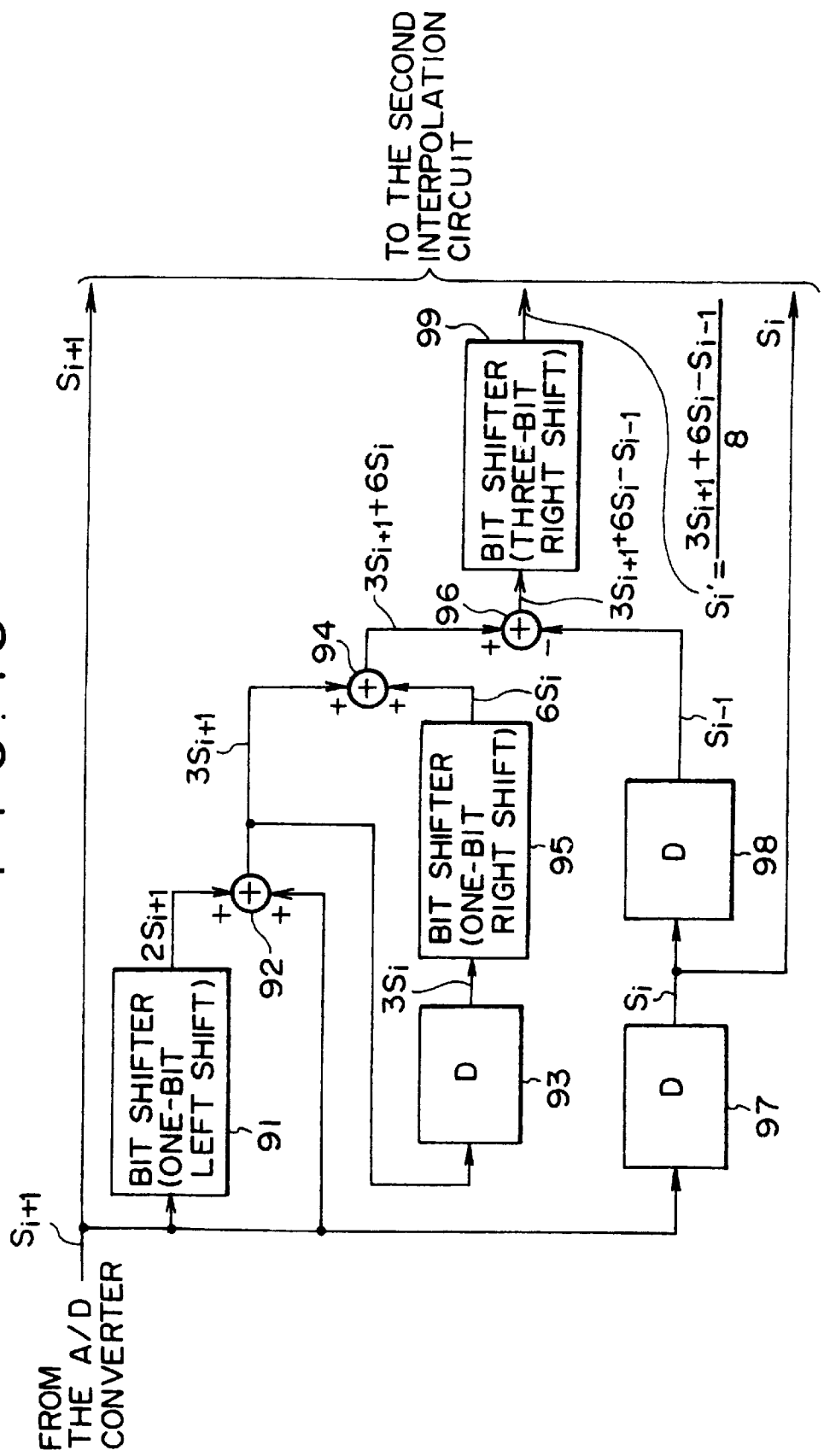
FIG. 15 is a block diagram showing another typical configuration of the first interpolation circuit 3 employed in the playback apparatus shown in FIG. 4.

FIG. 15 is a diagram showing another typical configuration of the first interpolation circuit 3 wherein a first interpolation value Si' is calculated by using an interpolation technique based on a quadratic function.

The first interpolation circuit 3 carries out interpolation based on a quadratic function using three sampled values Si−1, Si, and Si+1, which are sampled at points of time ti−1, ti and ti+1, as base points in order to find a value of the playback signal (or a first interpolation value) Si' at a point of time ((ti+ti+1)/2) between the points of time ti and ti+1.

It should be noted that the first interpolation value Si' is a value at a point of time ((ti+ti+1)/2) of the following quadratic fitting function:

$$y = a \times t^2 + b \times t + c$$

where coefficients a, b and c are found from the following three quadratic fitting functions of the sampled values:

$$Si+1 = a \times (ti+1)^2 + b \times ti+1 + c$$

$$Si = a \times (ti)^2 + b \times ti + c$$

$$Si-1 = a \times (ti-1)^2 + b \times ti-1 + c$$

That is to say, the first interpolation value Si' is computed as a value of the expression (3×Si+1+6×Si−Si−1)/8.

As shown in the figure, the first interpolation circuit 3 includes a bit shifter 91 for shifting the sampled value Si+1 supplied thereto by the A/D converter 2 by one bit toward the MSB and outputting the left-shifted value (2×Si+1) to an adder 92.

The adder 92 computes the sum of the sampled value Si+1 supplied thereto by the A/D converter 2 and the left-shifted (2×Si+1) supplied thereto by the bit shifter 91 and outputs the sum (3×Si+1) to an adder 94 and a delay element 93.

The delay element 93 is used for holding the sum (3×Si) supplied thereto by the adder 92 for one system-clock period and outputting the sum (3×Si) at the next system clock to a bit shifter 95. That is to say, at a system clock the sum (3×Si+1) is supplied thereto by the adder 92, the delay element 93 supplies the sum (3×Si) held therein so far for one system-clock period to the bit shifter 95.

The bit shifter 95 is used for shifting the sum (3×Si) supplied thereto by the delay element 93 by one bit toward the MSB and outputting the left-shifted value (6×Si) to an adder 94.

The adder 94 adds the sum (3×Si+1) supplied thereto by the adder 92 to the left-shifted value (6×Si) supplied thereto by the bit shifter 95, and outputs the sum (3×Si+1+6×Si) to an adder 96.

A delay element 97 holds the sampled value Si+1 supplied thereto by the A/D converter 2 for one system-clock period and outputs the sampled value Si+1 at the next system clock to a delay element 98 and the second interpolation circuit 4. That is to say, at a system clock the sampled value Si+1 is supplied by the A/D converter 2 to the delay element 97, the delay element 97 supplies the sampled value Si held therein so far for one system-clock period to the delay element 98 and the second interpolation circuit 4.

The delay element 98 holds the sampled value Si supplied thereto by the delay element 97 for one system-clock period and outputs the sampled value Si at the next system clock to the adder 96. That is to say, at a system clock the sampled value Si is supplied to the delay element 98 by the delay element 97, the delay element 98 outputs the sampled value Si−1 held therein so far for one system clock to the adder 96.

The adder 96 which is used as a subtractor computes the difference between the sampled value Si−1 supplied thereto by the delay element 98 and the sum (3×Si+1+6×Si) supplied thereto by the adder 94 and outputs the difference (3×Si+1+6×Si−Si−1) to a bit shifter 99.

The bit shifter 99 shifts the difference (3×Si+1+6×Si−Si−i) supplied thereto by the adder 96 by three bits toward the LSB and outputs the right-shifted value (3×Si+1+6×Si−Si−i)/8 to the second interpolation circuit 4 as the first interpolation value Si'.

Figure 16:
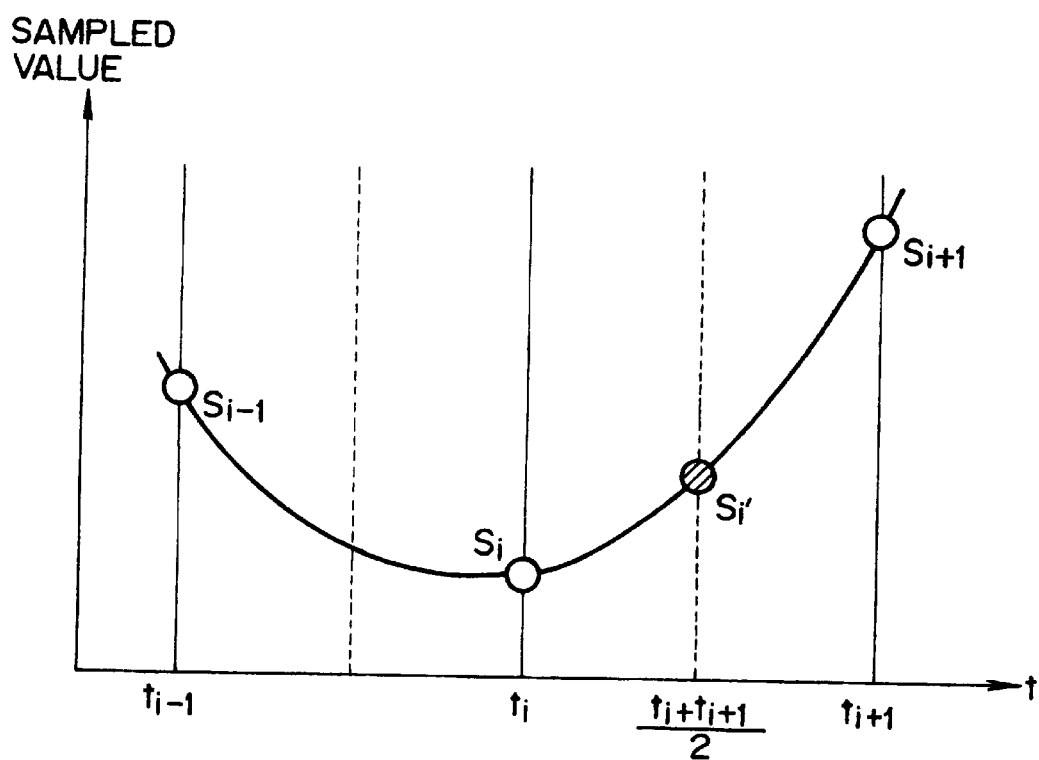
FIG. 16 is a diagram showing an example of a first interpolation value found by using an interpolation technique based on a quadratic function.

In this way, the first interpolation circuit 3 carries out interpolation based on a quadratic function using the three sampled values Si−1, Si and Si+1 as base points in order to find the first interpolation value Si' (=(3×Si+1+6×Si−Si−i)/8) as shown in FIG. 16, outputting the first interpolation value Si' along with the two sampled values Si and Si+1 to the second interpolation circuit 4.

It should be noted that the bit shifters 91, 95 and 99 employed in the first interpolation circuit 3 are each merely wired so that each bit of data supplied thereto is output as a shifted bit corresponding to the bit. As a result, bit-shifted data is output from the bit shifter at the same clock at which next data is supplied to the bit shifter.

A gate propagation delay occurs in each of the adders 92, 94 and 96 employed in the first interpolation circuit 3. However, there is no problem in particular as long as the circuit is not operated at a very high speed, a speed of such an order that the gate propagation delay can not be ignored. It should be noted that, if the circuit is operated at such a high speed that the gate propagation delay can not be ignored, delay elements need to be provided to adjust timing at circuit portions to appropriate timing that takes the gate propagation delays into consideration.

Figure 17:
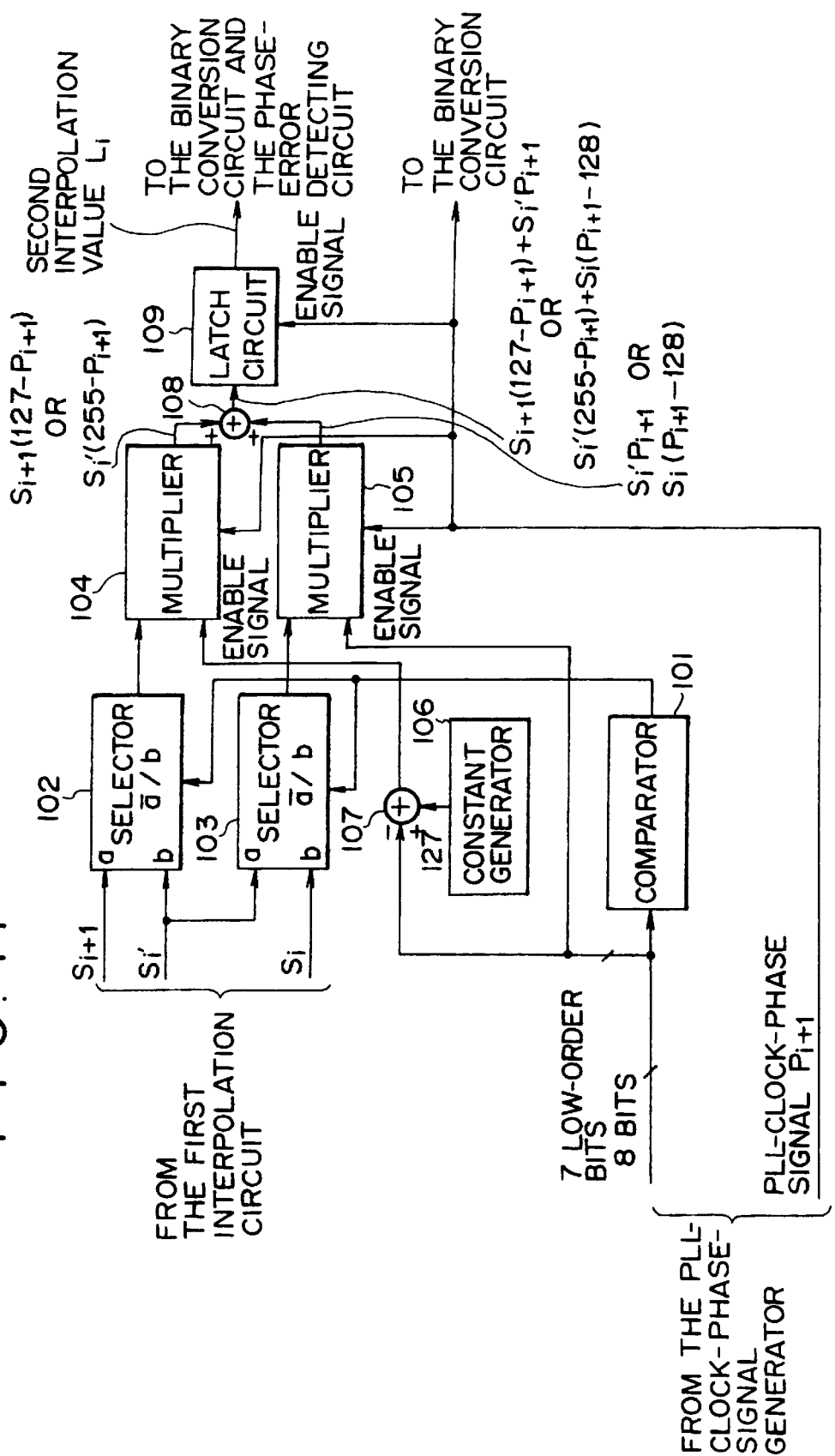
FIG. 17 is a block diagram showing another typical configuration of the second interpolation circuit 4 employed in the playback apparatus shown in FIG. 4.

FIG. 17 is a diagram showing another typical configuration of the second interpolation circuit 4 wherein the constant A has a value expressed by $2^n-2$. In this particular case, n=8 so that A=$2^8$−2=254.

As shown in the figure, a comparator 101 compares the value A/2(=127) supplied thereto by a constant generating circuit 106 with a value Pi+1 of the PLL-clock-phase signal P supplied thereto by the PLL-clock-phase-signal generator 8 by computing the difference (Pi+1−127) between them. The comparator 42 also finds out whether the computed difference (Pi+1−127) is positive or negative. If the computed difference (Pi+1−127) is found positive, that is, if Pi+1>127, a predetermined positive control signal is supplied to selectors 102 and 103. If the computed difference (Pi+1−127) is found negative or equal to zero, that is, if Pi+1≦127, on the other hand, a predetermined negative control signal is supplied to the selectors 102 and 103.

The selector 102 receives the sampled value Si+1 and the first interpolation value Si' supplied by the first interpolation circuit 3 by way of terminals a and b respectively of the selector 102. When a positive control signal is supplied to the selector 102 by the comparator 101, the selector 102 passes on the first interpolation value Si' supplied thereto by way of the terminal b to a multiplier 104. When a negative control signal is supplied to the selector 102 by the comparator 101, on the other hand, the selector 102 forwards the sampled value Si+1 supplied thereto by way of the terminal a to the multiplier 104.

By the same token, the selector 103 receives the sampled value Si and the first interpolation value Si' supplied by the first interpolation circuit 3 by way of terminals b and a respectively of the selector 103. When a positive control signal is supplied to the selector 103 by the comparator 101, the selector 103 passes on the sampled value Si supplied thereto by way of the terminal b to a multiplier 105. When a negative control signal is supplied to the selector 103 by the comparator 102, on the other hand, the selector 103 forwards the first interpolation value Si' supplied thereto by way of the terminal a to the multiplier 105.

An adder 107 which is used as a subtractor computes the difference between the constant A/2 having a digital value of 127 supplied thereto by the constant generating circuit 106 and the value Pi+1' of seven low-order bits of the eight-bit value Pi+1 of the PLL-clock-phase signal P supplied thereto by the PLL-clock-phase-signal generator 8, outputting the difference (127−Pi+1') to the multiplier 104. It should be noted that the value Pi+1' of the seven low-order bits of the eight-bit value Pi+1 is equal to Pi+1 if Pi+1 is smaller than 128. If Pi+1 is equal to or greater than 128, on the other hand, the value Pi+1' of the seven low-order bits of the eight-bit value Pi+1 is equal to Pi+1−128. Thus, the difference (127−Pi+1') is equal to (127−Pi+1) if Pi+1 is smaller than 128, or (255−Pi+1) if Pi+1 is equal to or greater than 128.

When an enable signal is supplied to the multiplier 104 by the PLL-clock-phase-signal generator 8, the multiplier 104 computes the product of the value Si+1 or Si' supplied thereto by the selector 102 and the difference (127−Pi+1') supplied thereto by the adder 107, outputting the product (Si+1×(127−Pi+1)) or (Si'×(255−Pi+1)) to an adder 108.

By the same token, when an enable signal is supplied to the multiplier 105 by the PLL-clock-phase-signal generator 8, the multiplier 105 computes the product of the value Si' or Si supplied thereto by the selector 103 and the value Pi+1' of seven low-order bits of the eight-bit value Pi+1 of the PLL-clock-phase signal P supplied thereto by the PLL-clock-phase-signal generator 8, outputting the product (Si'×Pi+1) or (Si×(Pi+1−128)) to the adder 108.

The adder 108 computes the sum of the product (Si+1×(127−Pi+1)) or (Si'×(255−Pi+1)) supplied thereto by the multiplier 104 and the product (Si'×Pi+1) or (Si×(Pi+1−128)) supplied thereto by the multiplier 105, outputting the sum (Si+1×(127−Pi+1)+Si'×Pi+1) or (Si'×(255−Pi+1)+Si×(Pi+1−128)) to the latch circuit 109.

When the enable signal is received by the latch circuit 109 from the PLL-clock-phase-signal generator 8, the latch circuit 109 updates the value stored in a storage device embedded therein with the sum supplied thereto from the adder 108 and, at the same time, outputs the value stored in the storage device to the binary conversion circuit 5 as well as feeds back the stored value to the phase-error detecting circuit 6 as a second interpolation value Li.

The operation of the second interpolation circuit 4 is explained as follows.

In the second interpolation circuit 4, if the value Pi+1 of the PLL-clock-phase signal P supplied thereto by the PLL-clock-phase-signal generator 8 is smaller than 128, that is, if Pi+1≦127, the selector 102 forwards the sampled value Si+1 supplied thereto to the multiplier 104. At the same time, since Pi+1 is smaller than 128, the adder 107 supplies the difference (127−Pi+1) to the multiplier 104. The multiplier 104 computes the product of the sampled value Si+1 and the difference (127−Pi+1), outputting the product (Si+1×(127−Pi+1) to the adder 108.

In addition, if the value Pi+1 is smaller than 128, the selector 103 passes on the first interpolation value Si' supplied thereto to the multiplier 105. At the same time, the value Pi+1' of the seven low-order bits of the eight-bit value Pi+1 supplied by the PLL-clock-phase-signal generator 8 is also supplied directly to the multiplier 105. As described above, the value Pi+1' of the seven low-order bits of the eight-bit value Pi+1 is equal to Pi+1 if Pi+1 is smaller than 128. The multiplier 105 computes the product of the first interpolation value Si' and the value Pi+1' which is equal to Pi+1, outputting the product (Si'×Pi+1) to the adder 108.

The adder 108 computes the sum of the product (Si+1×(127−Pi+1)) supplied thereto by the multiplier 104 and the product (Si'×Pi+1) supplied thereto by the multiplier 105, outputting the sum (Si+1×(127−Pi+1)+Si'×Pi+1) to the latch circuit 109.

If the value Pi+1 of the PLL-clock-phase signal P supplied thereto by the PLL-clock-phase-signal generator 8 is equal to or greater than 128, that is, if Pi+1>127, the selector 102 forwards the first interpolation value Si' supplied thereto to the multiplier 104. At the same time, since Pi+1 is equal to or greater than 128, the adder 107 supplies the difference (255−Pi+1(=127−(Pi+1−128))) to the multiplier 104. The multiplier 104 computes the product of the first interpolation value Si' and the difference (255−Pi+1), outputting the product (Si'×(255−Pi+1) to the adder 108.

In addition, if the value Pi+1 is equal to or greater than 128, the selector 103 passes on the sampled value Si supplied thereto to the multiplier 105. At the same time, the value Pi+1' of the seven low-order bits of the eight-bit value Pi+1 of the PLL-clock-phase signal P supplied by the PLL-clock-phase-signal generator 8 is also supplied directly to the multiplier 105. It should be noted that the value Pi+1' of the seven low-order bits of the eight-bit value Pi+1 is equal to (Pi+1−128) because Pi+1 is equal to or greater than 128 as described above. The multiplier 105 then computes the product of the sampled value Si and the value Pi+1' which is equal to (Pi+1−128), outputting the product (Si×(Pi+1−128)) to the adder 108.

The adder 108 computes the sum of the product (Si'×(255−Pi+1)) supplied thereto by the multiplier 104 and the product (Si×(Pi+1−128)) supplied thereto by the multiplier 105, outputting the sum (Si'×(255−Pi+1)+Si×(Pi+1−128)) to the latch circuit 109.

In this way, for Pi+1 smaller than 128, the second interpolation circuit 4 outputs (Si+1×(127−Pi+1)+Si'×Pi+1) as a second interpolation value. For Pi+1 equal to or greater than 128, on the other hand, the second interpolation circuit 4 generates (Si'×(255−Pi+1)+Si ×(Pi+1−128)) as a second interpolation value.

It should be noted that, for Pi+1 equal to or greater than 128, the present second interpolation circuit 4 generates (Si'×(255−Pi+1)+Si×(Pi+1−128)) as a second interpolation value as described above. On the other hand, the second interpolation circuit 4 produces (Si'×(254−Pi+1)+Si×(Pi+1−127)) as a second interpolation value for A=254. The second interpolation value generated by the present second interpolation circuit 4 is different to a certain degree from that output by the second interpolation circuit 4. None the less, the difference (Si'−Si) between the two is small, causing no particular problem in practical use.

The binary conversion circuit 5 shifts the second interpolation value received from the second interpolation circuit 4 by 7 bits toward the LSB prior to binary conversion processing. Since the second interpolation value is shifted by 7 bits toward the LSB, in actuality, the second interpolation value is divided by 128 (=A/2+1). The result of the division is all but equal to a result of division by 127 (A/2), causing no particular problem in practical use. It is needless to say that, in place of the bit shifting toward the LSB, an actual divider circuit can also be used to divide the second interpolation value by 127 (=A/2).

In this way, by setting the constant A at a value of $2^n-2$, the configuration of the second interpolation circuit 4 can be made simple.

Figure 18:
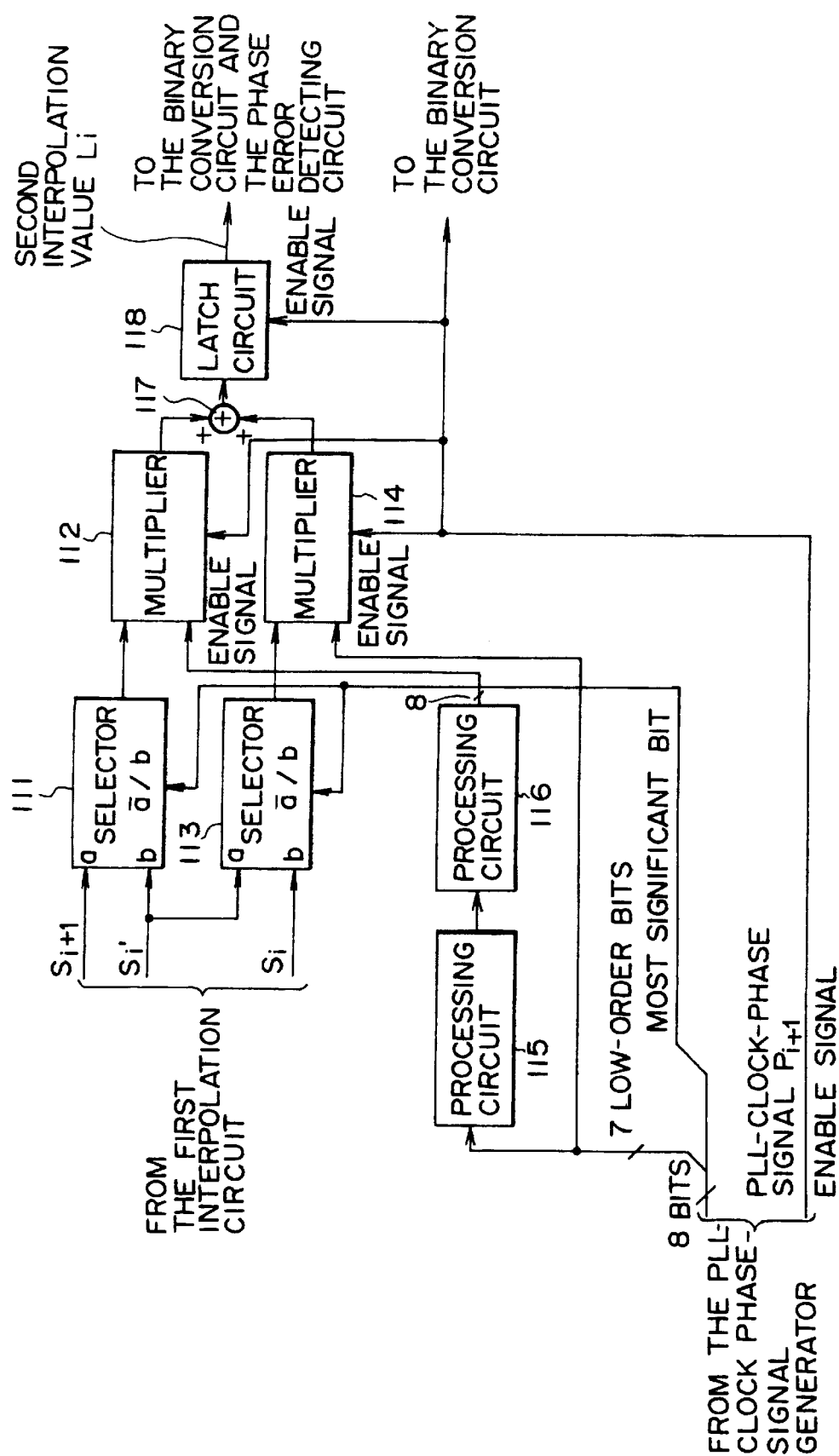
FIG. 18 is a block diagram showing still another typical configuration of the second interpolation circuit 4 employed in the playback apparatus shown in FIG. 4.

FIG. 18 is a diagram showing still another typical configuration of the second interpolation circuit 4 wherein the value of the constant A is 256.

A selector 111 shown in the figure receives the sampled value Si+1 and the first interpolation value Si' supplied by the first interpolation circuit 3 by way of terminals a and b respectively of the selector 111. When the most significant bit (MSB) of the eight-bit value Pi+1 of the PLL-clock-phase signal P supplied to the selector 111 by the PLL-clock-phase-signal generator 8 is 1, that is, when Pi+1≧128, the selector 111 passes on the first interpolation value Si' supplied thereto by way of the terminal b to a multiplier 112. When the most significant bit (MSB) of the eight-bit value Pi+1 of the PLL-clock-phase signal P is 0, that is, when Pi+1<128, on the other hand, the selector 111 passes on the sampled value Si+1 supplied thereto by way of the terminal a to the multiplier 112.

By the same token, the selector 113 receives the sampled value Si and the first interpolation value Si' supplied by the first interpolation circuit 3 by way of terminals b and a respectively of the selector 113. When the most significant bit (MSB) of the eight-bit value Pi+1 of the PLL-clock-phase signal P supplied to the selector 113 by the PLL-clock-phase-signal generator 8 is 1, that is, when Pi+1≧128, the selector 113 passes on the sampled value Si supplied thereto by way of the terminal b to a multiplier 114. When the most significant bit (MSB) of the eight-bit value Pi+1 of the PLL-clock-phase signal P is 0, that is, when Pi+1<128, on the other hand, the selector 113 forwards the first interpolation value Si' supplied thereto by way of the terminal a to the multiplier 114.

A processing circuit 115 computes the two's-complement of the value Pi+1' of the seven low-order bits of the eight-bit value Pi+1 of the PLL-clock-phase signal P supplied by the PLL-clock-phase-signal generator 8 and outputs the seven-bit result of the calculation to a processing circuit 116. It should be noted that, for Pi+1'>0, the two's-complement of Pi+1' is 128−Pi+1'. For Pi+1'=0, on the other hand, the two's-complement of Pi+1' is also 0.

If the seven-bit result of the calculation produced by the processing circuit 115 is zero, the processing circuit 116 supplies an eight-bit value of 128 to a multiplier 112. If the seven-bit result of the calculation supplied by the processing circuit 115 is not zero, on the other hand, the processing circuit 116 passes on the non-zero result of the calculation to the multiplier 112. In either case, a value (128−Pi+1') is supplied to the multiplier 112 as a result produced by the processing circuits 115 and 116.

Figure 19:
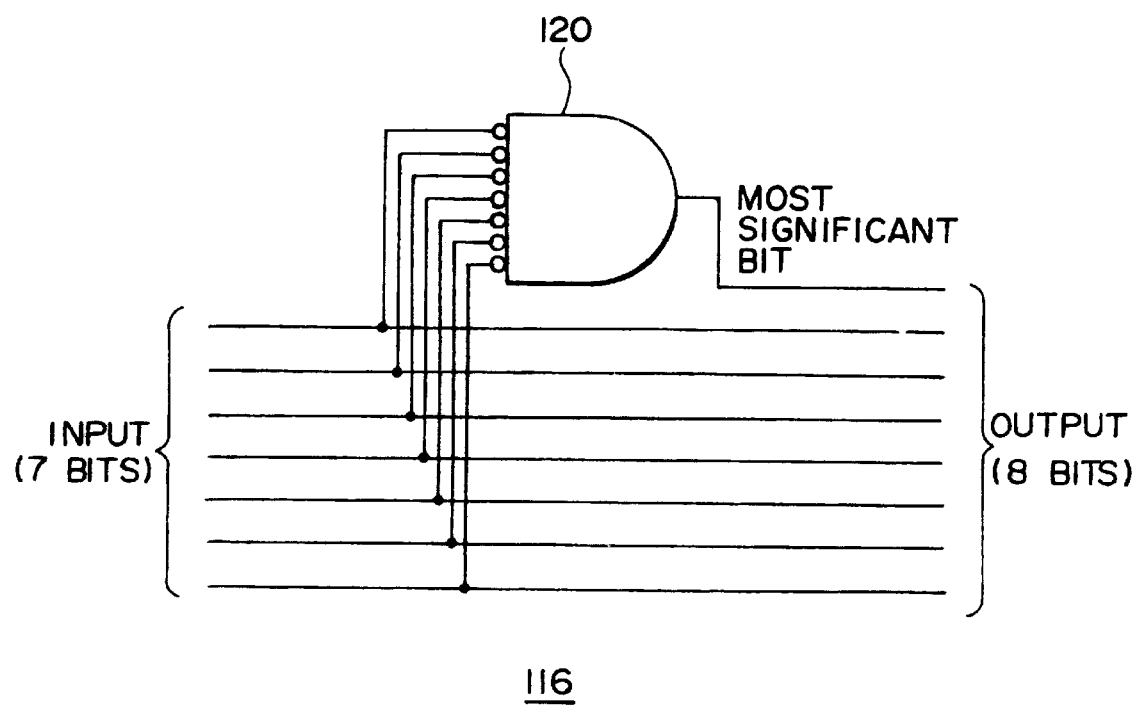
FIG. 19 is a circuit diagram showing a typical configuration of a processing circuit 116 employed in the second interpolation circuit 4 shown in FIG. 18.

FIG. 19 is a diagram showing a typical configuration of the processing circuit 116. In the processing circuit 116, the value of the seven-bit input data received from the processing circuit 115 is used as the value of seven low-order bits of eight-bit output data. An AND circuit 120 employed in the processing circuit 116 outputs the most significant bit of the eight-bit output data. The AND circuit 120 inverts all the seven bits of the input data. Accordingly, the most significant bit of the eight-bit output data is 1 only when all the seven bits of the input data are 0. Otherwise, the most significant bit is 0.

When an enable signal is supplied to the multiplier 112 by the PLL-clock-phase-signal generator 8, the multiplier 112 computes the product of the value Si+1 or Si' supplied thereto by the selector 111 and the value (128−Pi+1') supplied thereto by the processing circuit 116, outputting the product (Si+1×(128−Pi+1)) or (Si'×(256−Pi+1)) to an adder 117.

By the same token, when an enable signal is supplied to the multiplier 114 by the PLL-clock-phase-signal generator 8, the multiplier 114 computes the product of the value Si or Si' supplied thereto by the selector 113 and the value Pi+1' of the seven low-order bits of the eight-bit value Pi+1 of the PLL-clock-phase signal P supplied by the PLL-clock-phase-signal generator 8, outputting the product (Si'×Pi+1) or (Si×(Pi+1−128)) to the adder 117.

The adder 117 computes the sum of the product (Si+1×(128−Pi+1)) or (Si'×(256−Pi+1)) supplied thereto by the multiplier 112 and the product (Si'×Pi+1) or (Si×(Pi+1−128)) supplied thereto by the multiplier 114, outputting the sum (Si+1×(128−Pi+1)+(Si'×Pi+1)) or (Si'×(256−Pi+1)+Si×(Pi+1−128)) to the latch circuit 118.

When the enable signal is received by the latch circuit 118 from the PLL-clock-phase-signal generator 8, the latch circuit 118 updates the value stored in a storage device embedded therein with the sum supplied thereto by the adder 117 and, at the same time, outputs the value stored in the storage device to the binary conversion circuit 5 as well as feeds back the stored value to the phase-error detecting circuit 6 as a second interpolation value Li.

The operation of the second interpolation circuit 4 is explained as follows.

In the second interpolation circuit 4, if the value Pi+1 of the PLL-clock-phase signal P supplied thereto by the PLL-clock-phase-signal generator 8 is smaller than 128, that is, if the most significant bit of the value Pi+1 is 0, the selector 111 forwards the sampled value Si+1 supplied thereto to the multiplier 112. At the same time, the processing circuit 116 supplies the value (128−Pi+1) to the multiplier 112. The multiplier 112 computes the product of the sampled value Si+1 and the value (128−Pi+1), outputting the product (Si+1×(128−Pi+1) to the adder 117.

In addition, if the value Pi+1 is smaller than 128, the selector 113 passes on the first interpolation value Si' supplied thereto to the multiplier 114. At the same time, the value Pi+1' of the seven low-order bits of the eight-bit value Pi+1 supplied by the PLL-clock-phase-signal generator 8 which is equal to Pi+1 if Pi+1 is smaller than 128, is also supplied directly to the multiplier 114. The multiplier 114 computes the product of the first interpolation value Si' and the value Pi+1' which is equal to Pi+1, outputting the product (Si'×Pi+1) to the adder 117.

The adder 117 computes the sum of the product (Si+1×(128−Pi+1)) supplied thereto by the multiplier 112 and the product (Si'×Pi+1) supplied thereto by the multiplier 114, outputting the sum (Si+1×(128−Pi+1)+Si'×Pi+1) to the latch circuit 118.

If the value Pi+1 of the PLL-clock-phase signal P supplied thereto by the PLL-clock-phase-signal generator 8 is equal to or greater than 128, that is, if the most significant bit of the value Pi+1 is 1, on the other hand, the selector 111 forwards the first interpolation value Si' supplied thereto to the multiplier 112. At the same time, the processing circuit 116 supplies the value (256−Pi+1 (=128−(Pi+1−128))) to the multiplier 112. The multiplier 112 computes the product of the first interpolation value Si' and the value (256−Pi+1), outputting the product (Si'×(256−Pi+1) to the adder 117.

In addition, if the value Pi+1 is equal to or greater than 128, the selector 113 passes on the sampled value Si supplied thereto to the multiplier 114. At the same time, the value Pi+1' of the seven low-order bits of the eight-bit value Pi+1 supplied by the PLL-clock-phase-signal generator 8 which is equal to (Pi+1−128) because Pi+1 is equal to or greater than 128, is also supplied directly to the multiplier 114. The multiplier 114 computes the product of the sampled value Si and the value Pi+1' which is equal to (Pi+1−128), outputting the product (Si×(Pi+1−128)) to the adder 117.

The adder 117 computes the sum of the product (Si'×(256−Pi+1)) supplied thereto by the multiplier 112 and the product (Si×(Pi+1−128)) supplied thereto by the multiplier 114, outputting the sum (Si'×(256−Pi+1)+Si×(Pi+1−128)) to the latch circuit 118.

In this way, for Pi+1 smaller than 128, the second interpolation circuit 4 outputs (Si+1×(128−Pi+1)+Si'×Pi+1) as a second interpolation value. For Pi+1 equal to or greater than 128, on the other hand, the second interpolation circuit 4 generates (Si'×(256−Pi+1)+Si×(Pi+1−128)) as a second interpolation value.

In this case, since the constant A is set at 256, the upper-limit value X of the PLL-clock-phase signal P is set at a predetermined value greater than 256. As a result, the value Pi of the PLL-clock-phase signal P may exceed 256. Since the value Pi of the PLL-clock-phase signal P is equal to or smaller than 255 at a phase zero-cross, that is, at a point of time the second interpolation value is calculated, however, the value Pi of the PLL-clock-phase signal P can be expressed by only eight bits.

As described above, in this embodiment, a first interpolation value is calculated as a value of a playback signal at a point of time between two consecutive system clocks. Thus, the number of sampled values seemingly appears doubled. It should be noted that each period between two consecutive system clocks may be divided into n segments where n>2 and (n−1) first interpolation values can be calculated between the n segments. Then, a second interpolation value is found from the first interpolation values and the sampled values from which the first interpolation values are computed.

Also as described above, in the first interpolation circuit 3 of the embodiment, the so-called over-sampling is carried out on a playback signal by utilizing a quadratic or third-order function. It is worth noting that, the over-sampling of a playback signal can also be carried out by means of a linear filter that exhibits a high-order sharp cut-off characteristic in order to increase the number of sampled values.

What is claimed is:

1. A playback method comprising the steps of:

computing a second digital value from first digital values obtained by sampling a predetermined signal in synchronization with a first clock signal at a predetermined point of time different from a sampling time synchronized with said first clock signal by interpolation based on a function of at least a second order;

computing an interpolation value of said predetermined signal at a predetermined phase of a second clock signal from said first and second digital values;

computing a phase error of said interpolation value; and generating said second clock signal by adjusting the clock frequency thereof in accordance with said phase error.

2. A playback apparatus comprising:

a first interpolation means for computing a second digital value from three first digital values, said second digital value obtained by sampling a predetermined signal between two consecutive sampling times in synchronization with a first clock signal, said second digital value computed at a predetermined point of time different from the sampling times and synchronized with said first clock signal by interpolation based on a quadratic function;

a second interpolation means for computing an interpolation value of said predetermined signal at a predetermined phase of a second clock signal from said first and second digital values;

a phase-error computing means for computing a phase error of said interpolation value; and a clock-signal generating means for generating said second clock signal by adjusting the clock frequency thereof in accordance with said phase error.

3. A playback apparatus comprising:

a first interpolation means for computing a second digital value from four first digital values, said second digital value obtained by sampling a predetermined signal between three consecutive sampling times in synchronization with a first clock signal, said second digital value computed at a predetermined point of time different from the sampling times and synchronized with said first clock signal by interpolation based on a third-order function;

a second interpolation means for computing an interpolation value of said predetermined signal at a predetermined phase of a second clock signal from said first and second digital values;

a phase-error computing means for computing a phase error of said interpolation value; and a clock-signal generating means for generating said second clock signal by adjusting the clock frequency thereof in accordance with said phase error.

4. A playback method comprising the steps of:

computing a second digital value from at least three first digital values obtained by sampling a predetermined signal in synchronization with a first clock signal at a predetermined point of time different from a sampling time and synchronized with said first clock signal by interpolation based on a function of at least second order;

computing an interpolation value of said predetermined signal at a predetermined phase of a second clock signal from said first and second digital values;

computing a phase error of said interpolation value; and generating said second clock signal by adjusting the clock frequency thereof in accordance with said phase error.

* * * * *